(12) United States Patent
Lim et al.

(10) Patent No.: US 7,693,812 B2
(45) Date of Patent: Apr. 6, 2010

(54) QUERYING DATA AND AN ASSOCIATED ONTOLOGY IN A DATABASE MANAGEMENT SYSTEM

(75) Inventors: Lipyeow Lim, North White Plains, NY (US); Haixun Wang, Irvington, NY (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 11/623,941

(22) Filed: Jan. 17, 2007

(65) Prior Publication Data

US 2008/0172353 A1 Jul. 17, 2008

(51) Int. Cl.
*G06F 17/00* (2006.01)
(52) U.S. Cl. .................................. 707/1; 707/2; 707/3
(58) Field of Classification Search .................. 707/1–3
See application file for complete search history.

(56) References Cited

U.S. PATENT DOCUMENTS 6,665,664 B2  12/2003  Paulley et al.
2002/0023091 A1  2/2002  Silberberg et al.
2003/0163461 A1*  8/2003  Gudbjartsson et al. ......... 707/3
2004/0153435 A1*  8/2004  Gudbjartsson et al. ......... 707/1
2005/0187952 A1  8/2005  Werner
2005/0234889 A1*  10/2005  Fox et al. ...................... 707/3
2006/0036633 A1*  2/2006  Chong et al. ................. 707/101
2006/0167856 A1*  7/2006  Angele et al. ................. 707/3
2006/0259457 A1  11/2006  Muras et al.

OTHER PUBLICATIONS

U.S. Appl. No. 11/623,952, filed Jan. 17, 2007, Lim et al.

* cited by examiner

*Primary Examiner*—Mohammad Ali
*Assistant Examiner*—John P Hocker
(74) *Attorney, Agent, or Firm*—Yee & Associates, P.C.; Kenneth R. Corsello

(57) ABSTRACT

A method, apparatus, and computer program for querying data and an associated ontology in a database. An ontology is associated with data in database. Responsive to receiving a query from a requestor, relational data in the database is identified using the query to form identified relational data. Ontological knowledge in the ontology is identified using the identified relational data and the ontology. A result is returned to the requestor.

20 Claims, 15 Drawing Sheets

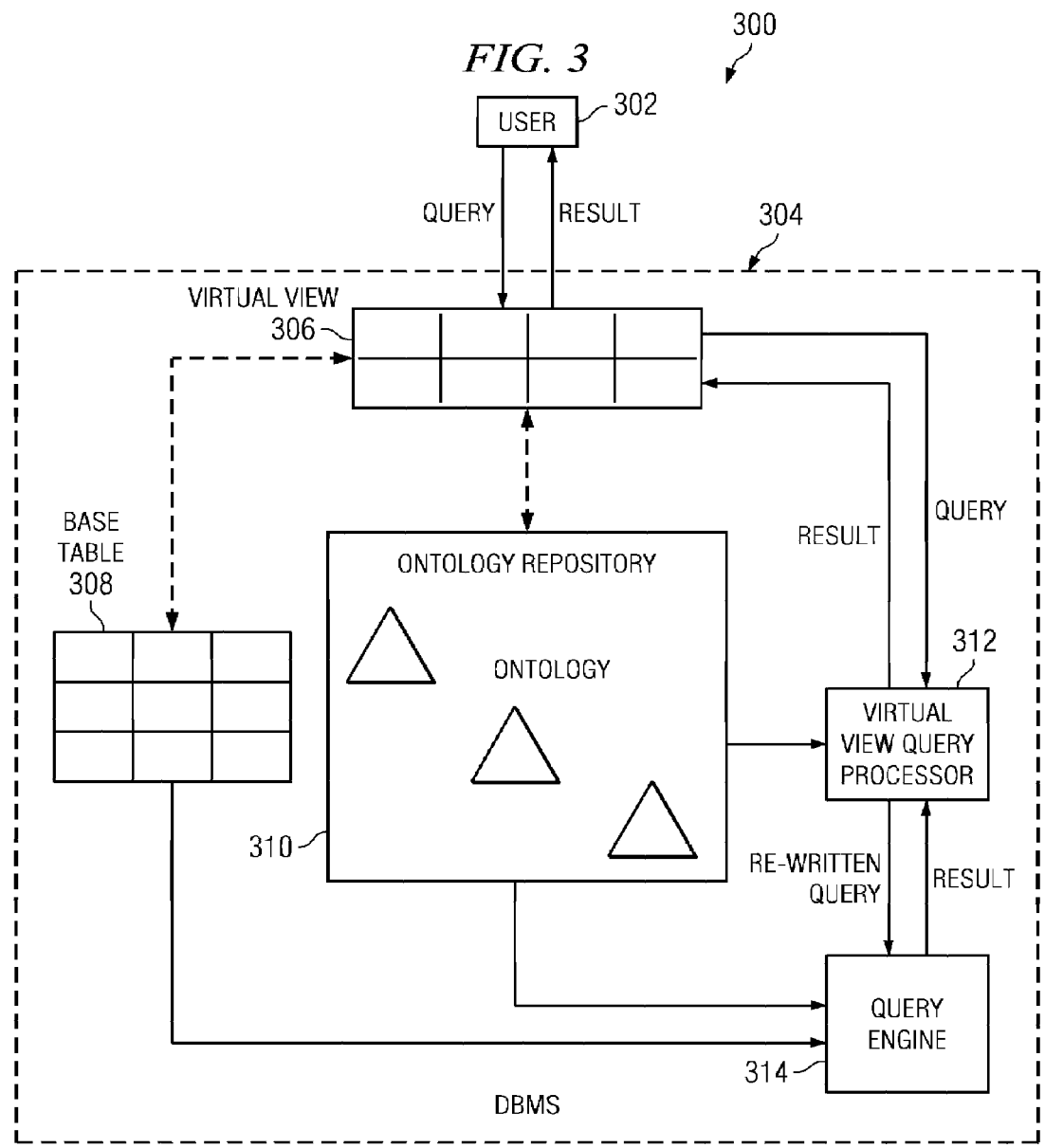

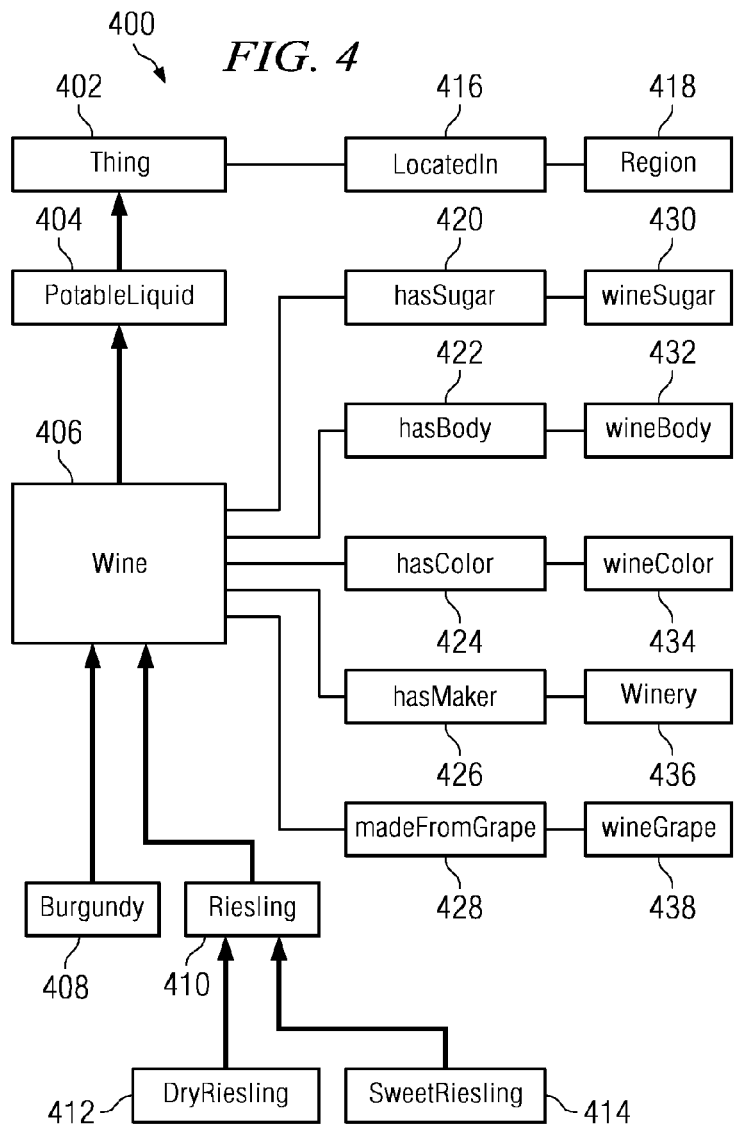
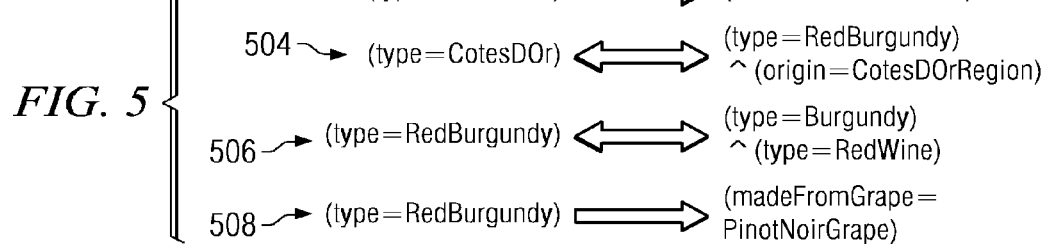

QUERY 702
```
SELECT W.Id
FROM WineView AS W
WHERE 'UnitedStates' IN W.locatedIn;
```

QUERY 704
```
SELECT W.Id
FROM WineView AS W
WHERE W.hasColor = 'red';
```

706 COMMAND
```
CREATE VIEW WineView(Id, Type, Origin, Maker,
Price, locatedIn) AS
SELECT W.*, R.superRegions
FROM Wine AS W, RegionKnowledge AS R
WHERE W.Origin = R.region
```

FIG. 8

```
CREATE VIRTUAL VIEW WineView(Id, Type, Origin,
    Maker, Price, locatedIn, hasColor) AS SELECT W.*,    ⎫
        TC(O.object.locatedIn, 'subRegion'),              ⎬ 802
        O.object.hasColor,                                ⎭
FROM Wine AS W, WineOntology AS O  ~ 804
WHERE O.object = W.type  ~ 806
AND O.object.isA('Wine') = true  ~ 808
AND O.object.locatedIn = W.origin  ~ 810
AND O.object.hasMaker = W.maker  ~ 812
```

FIG. 9

902 ~ CREATE TABLE ClassHierarchy(id integer, name VARCHAR(27), hierarchy XML);

904
```
insert into ClassHierarchy values(1, 'Wine', XMLParse('<?xml version='1.0'>
<wine>
    <WhiteWine>
        <WhiteBurgundy>
            ...
        </WhiteBurgundy>
        ...
    </WhiteWine>
    <DessertWine>
        <SweetRiesling/>
        ...
    </DessertWine>
    ...
</wine>'));
```

906
```
SELECT id, name
FROM ClassHierarchy AS C
WHERE XMLExists('$t/Wine/DessertWine
        /SweetRiesling'
    Passing BY REF C.order AS
    "t")
```

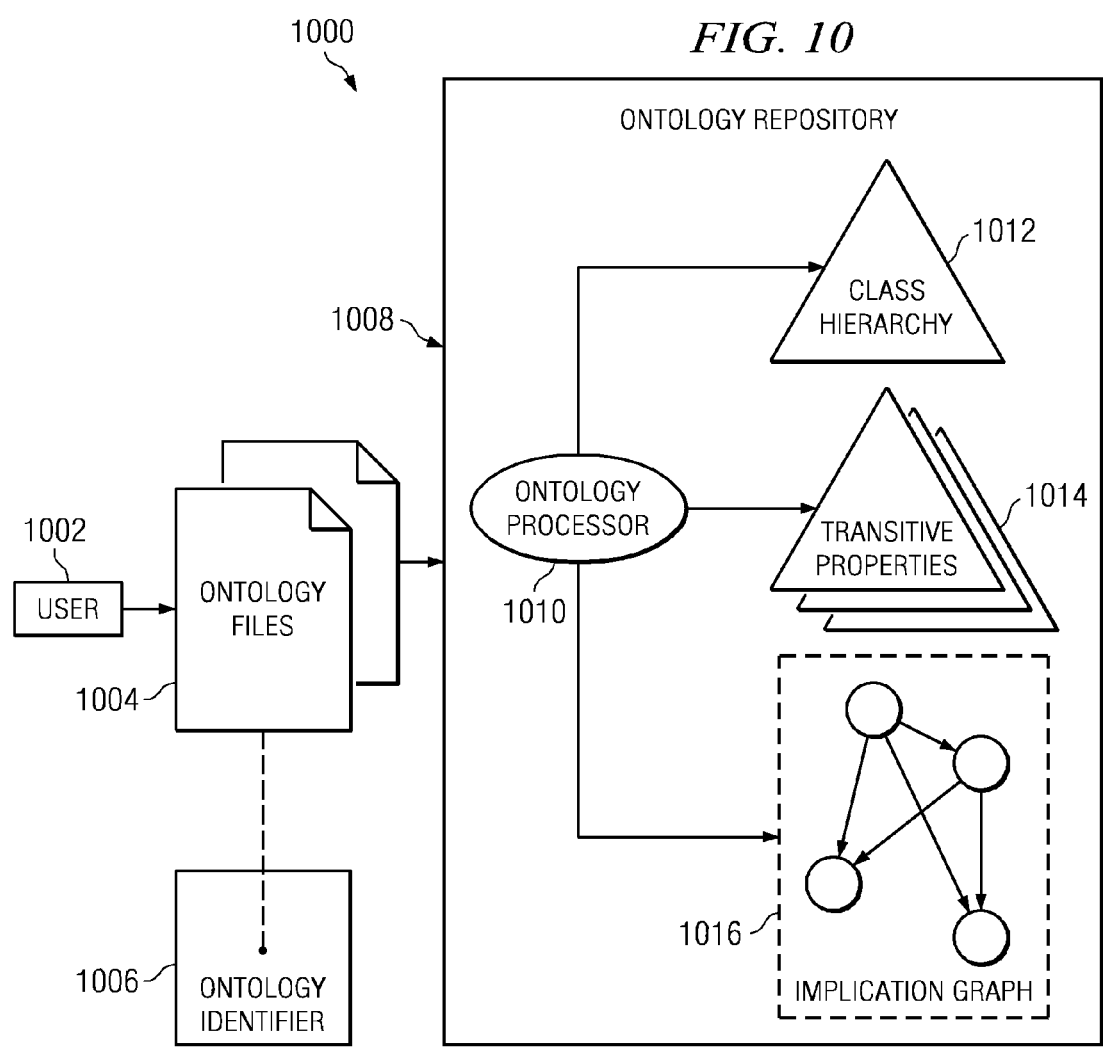

```
<owl:Class rdf:ID="SweetRiesling">
    <rdfs:subClassOf rdf:resource="#DessertWine" />
...
</owl:Class>
```

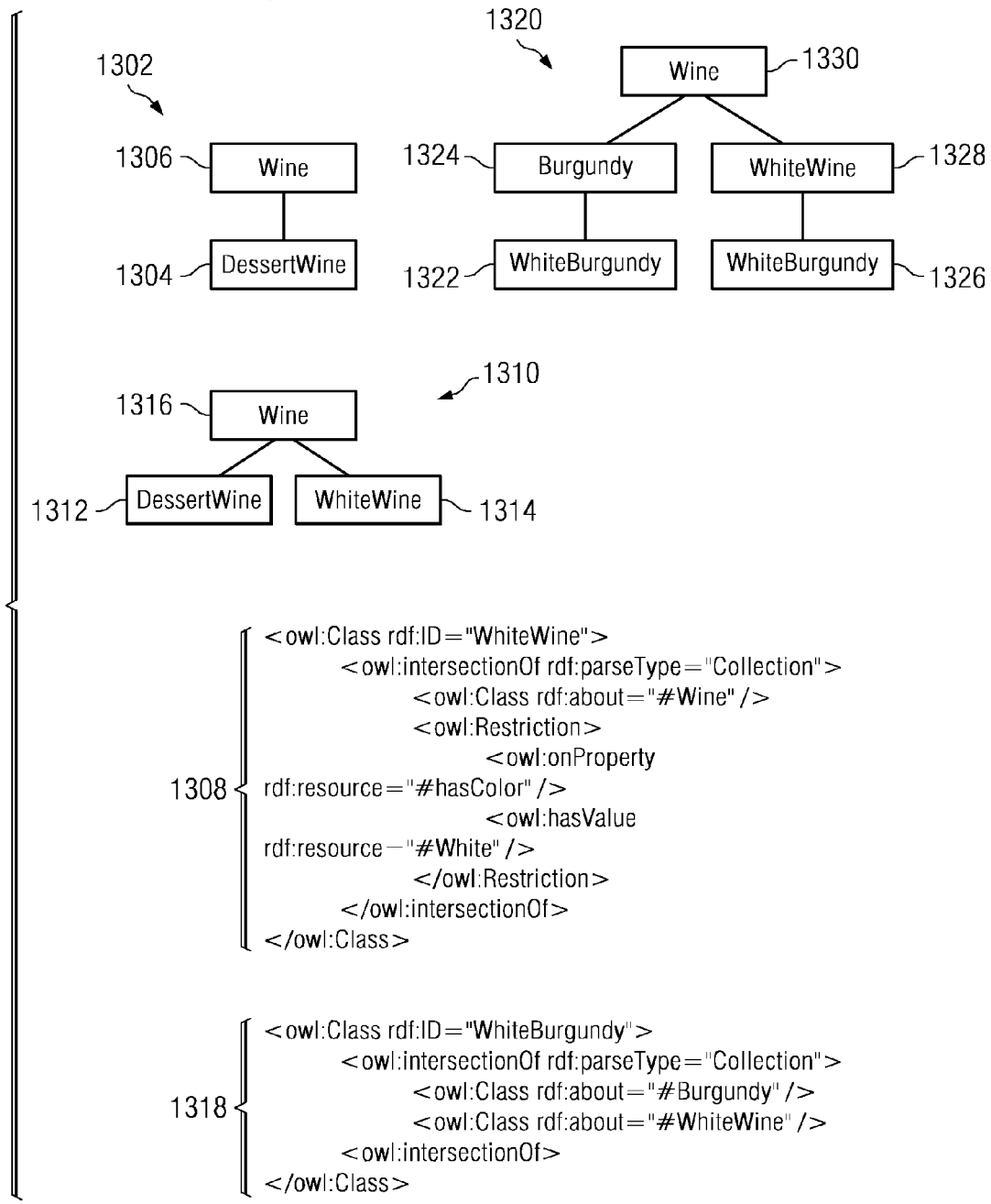

*FIG. 14*

1402
```
<owl:ObjectProperty rdf:ID="locatedIn>
    <rdf:type rdf:resource
        ="&owl;TransitiveProperty" />
    <rdfs:domain rdf:resource
        ="http://www.w3.org/2002/07/owl#Thing" />
    <rdfs:range rdf:resource
        ="#Region" />
</owl:ObjectProperty>
```

1404
```
<Region rdf:ID="USRegion" />
<Region rdf:ID="CaliforniaRegion">
    <locatedIn rdf:resource="#USRegion" />
</Region>
<Region rdf:ID="TexasRegion">
    <locatedIn rdf:resource="#USRegion" />
</Region>
```

1406

```
            USRegion
           /        \
  CaliforniaRegion   TexasRegion
```

*FIG. 15*

1502
```
<owl:Class rdf:about="#Zinfandel">
    <rdfs:subClassOf>
        <owl:Restriction>
            <owl:onProperty rdf:resource ="#hasColor" />
            <owl:hasValue rdf:resource="#Red" />
        </owl:Restriction>
    </rdfs:subClassOf>
    <rdfs:subClassOf>
        <owl:Restriction>
            <owl:onProperty rdf:resource="#hasSugar" />
            <owl:hasValue rdf:resource="#Dry" />
        </owl:Restriction>
    <rdfs:subClassOf>
    ...
</owl:Class>
```

FIG. 16

```
<owl:Class rdf:about="#Zinfandel">
  <rdfs:subClassOf>
   <owl:Restriction>
    <owl:onProperty rdf:resource="#hasBody"/>
    <owl:allValuesFrom>
     <owl:Class>
      <owl:oneOf rdf:parseType="Collection">
       <owl:Thing rdf:about="#Full"/>
       <owl:Thing rdf:about="#Medium"/>
      </owl:oneOf>
     </owl:Class>
    </owl:allValuesFrom>
   </owl:Restriction>
  </rdfs:subClassOf>
  ...
</owl:Class>
```
1602

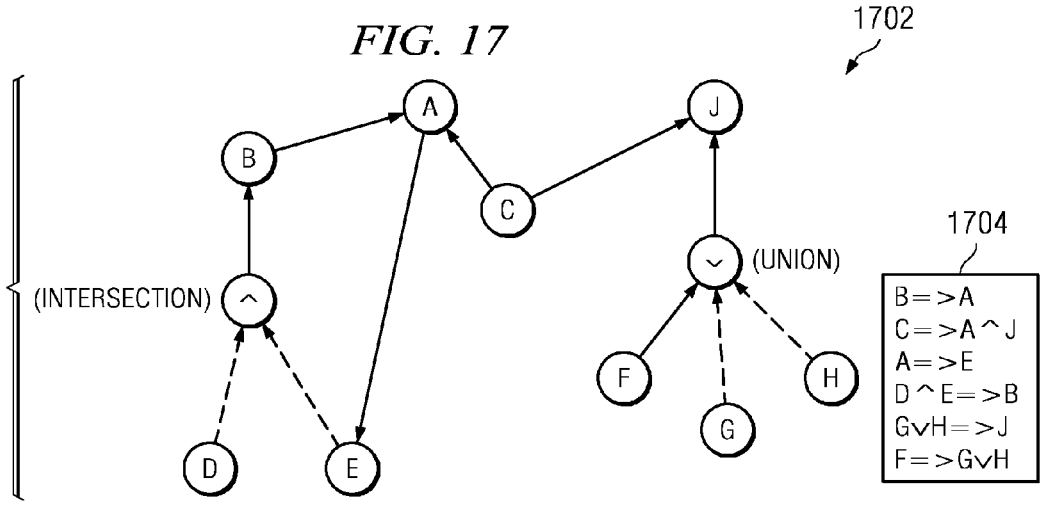

FIG. 17

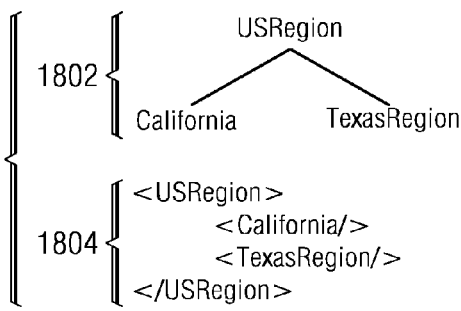

FIG. 18

1802: USRegion — California, TexasRegion

1804:
```
<USRegion>
    <California/>
    <TexasRegion/>
</USRegion>
```

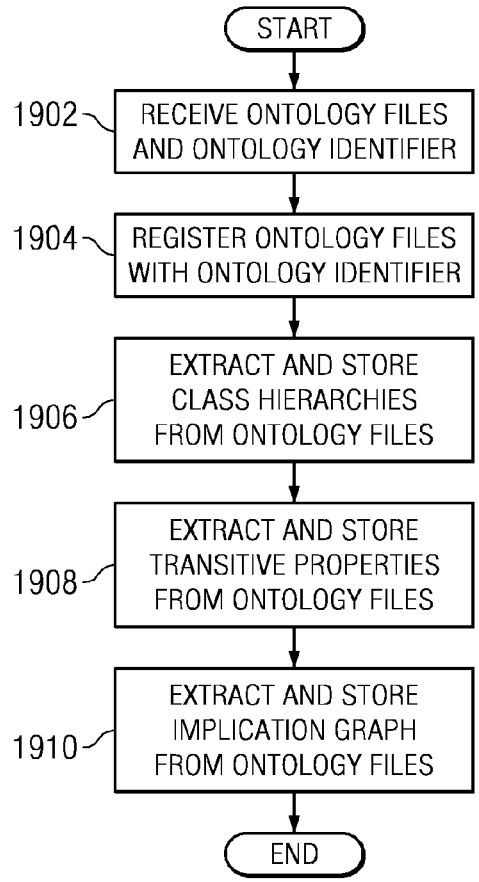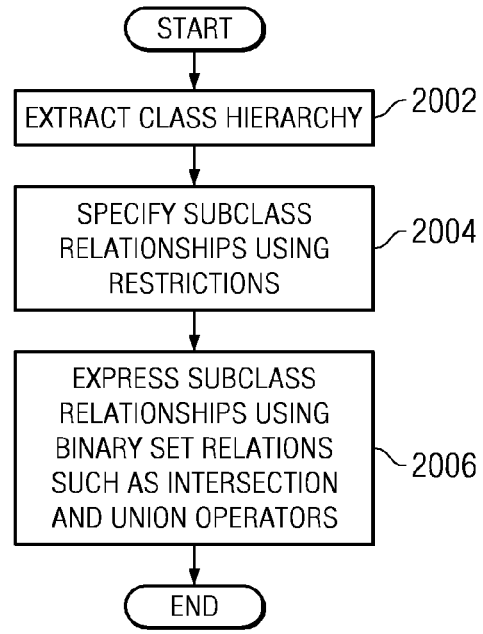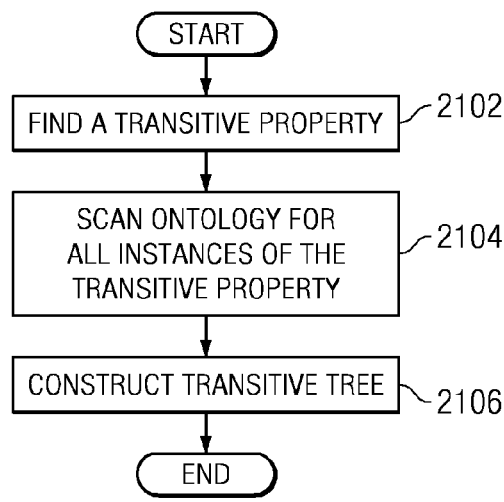

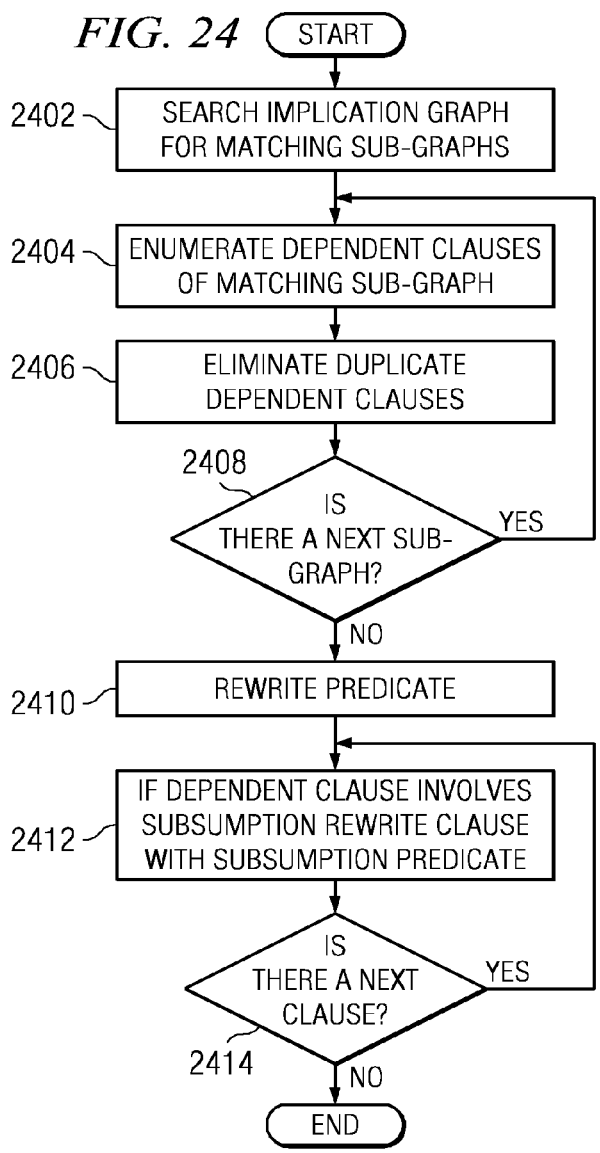

FIG. 26
{
QUERY 2602 { SELECT V.Id
FROM Wine AS V
WHERE US ∈ V.locatedIn;

QUERY 2604 { SELECT W.Id
FROM Wine AS W, TransitiveProperty AS T
WHERE T.ontId='wine'
AND T.propID='locatedIn'
AND XMLExists(T.tree//USRegion//W.origin);
}

FIG. 27
{
QUERY 2702 { SELECT Id
FROM Wineview as W
where W.hasColor=red;

IMPLICATIONS 2704 { (type=RedWine) => (hasColor=red)
(type=Zinfandel) => (hasColor=red)

CLASS HIERARCHY 2706 {
```
            Wine
           /    \
         Port   RedWine
         /      /      \
    RedBordeaux    RedBurgundy
       /                   \
   Zinfandel            CotesDOr
```

2708 EXPANDED QUERY { SELECT Id
FROM WineBaseTable as B
WHERE (B.type=RedWine) OR (B.type=Zinfandel)

2710 REWRITTEN QUERY { SELECT Id
FROM WineBaseTable as B
WHERE
    (B.type=RedWine) OR
        isSubsumed(B.type, RedWine) OR
    (B.type=Zinfandel) OR
        isSubsumed(B.type, Zinfandel)
}

QUERYING DATA AND AN ASSOCIATED ONTOLOGY IN A DATABASE MANAGEMENT SYSTEM

BACKGROUND OF THE INVENTION

1. Field of the Invention

The present invention relates generally to data processing systems and in particular, the present invention relates to a method, apparatus and computer program product for querying data in a database. Still more particularly, the present invention relates to a method, apparatus, and computer program product for querying data and an associated ontology in a database management system.

2. Description of the Related Art

The term "data" generally refers to information that is highly structured and has fixed relationships between the different pieces of information, called the data elements. A set of data elements that are logically related may be stored in a systematic way as a collection of records in a computer, called a database. The logical relationships between the data elements allow the database to be queried and information extracted from the database. By querying the database, a user can extract meaningful information about the data elements. The computer program used to manage and query a database is known as a database management system (DBMS).

The database management system manages the data based on the relationships between the data elements. A database management system manages the data by providing a way to perform various operations to the data elements. The operations that may be performed to the data elements in a database include adding data elements, removing data elements, modifying data elements, sorting data elements, and querying the data elements. A database query typically contains one or more logical rules. In processing a query, the database management system extracts from the database all the data elements which match the logical rules in the query.

The term "ontology" generally refers to knowledge about the data elements. A given set of data elements may have one or more associated ontologies. An ontology has characteristics that do not make it suitable for storage in a database. For example, the knowledge in an ontology is typically less structured than the data elements. Therefore, an ontology is typically not stored or managed by a database management system.

Currently, users can query data elements in a database using a database management system. However, users cannot query the ontology associated with the data elements in the same way because the ontology is not suited for being stored in a database. Users also cannot query the data elements and the ontology together to infer new knowledge.

Because the ontology contains valuable information about the data elements, if the data elements and ontology could be linked and managed together, users could then formulate queries to infer new knowledge based on the data elements and the ontology.

SUMMARY OF THE INVENTION

The different embodiments provide a method, apparatus, and computer program product for querying data and an associated in a database. An ontology is associated with data in a database. Responsive to receiving a query from a requestor, relational data in the database is identified using the query to form identified relational data. Ontological knowledge in the ontology is identified using the identified relational data and the ontology. A result is returned to the requester.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a user interaction with a database management system (DBMS), in accordance with an illustrative embodiments;

FIG. 4 is a block diagram of a class hierarchy in a wine ontology in accordance with an illustrative embodiment;

FIG. 5 depicts rules in a wine ontology, in accordance with an illustrative embodiment;

FIG. 8 is a diagram depicting a virtual view command in accordance with an illustrative embodiment;

FIG. 9 depicts commands to a hybrid relational-XML database in accordance with an illustrative embodiment;

FIG. 10 is a block diagram depicting a user interaction with an ontology repository in accordance with an illustrative embodiment;

FIG. 13 is a block diagram of a class and sample code is illustrated in accordance with an illustrative embodiment;

FIG. 14 is an example of code for specifying transitive properties of a Wine ontology in accordance with an illustrative embodiment;

FIG. 15 is an example of a conjunctive implication in accordance with an illustrative embodiment;

FIG. 16 is an example of a disjunctive implication in accordance with an illustrative embodiment;

FIG. 17 is a block diagram of an implication graph in accordance with an illustrative embodiment;

FIG. 18 is an example of a class hierarchy in accordance with an illustrative embodiment;

FIG. 19 is a flow diagram of an ontology processor in accordance with an illustrative embodiment;

FIG. 20 is a flow diagram for extracting a class hierarchy in accordance with an illustrative embodiment;

FIG. 21 is a flow diagram for extracting transitive properties in accordance with an illustrative embodiment;

FIG. 24 is a flow diagram of a processor in accordance with an illustrative embodiment;

FIG. 25 is an example of a query in accordance with an illustrative embodiment;

FIG. 26 is an example of a query in which illustrative embodiments may be implemented; and FIG. 27 is an example of a query in which illustrative embodiments may be implemented.

DETAILED DESCRIPTION OF THE PREFERRED EMBODIMENT

Figure 1:
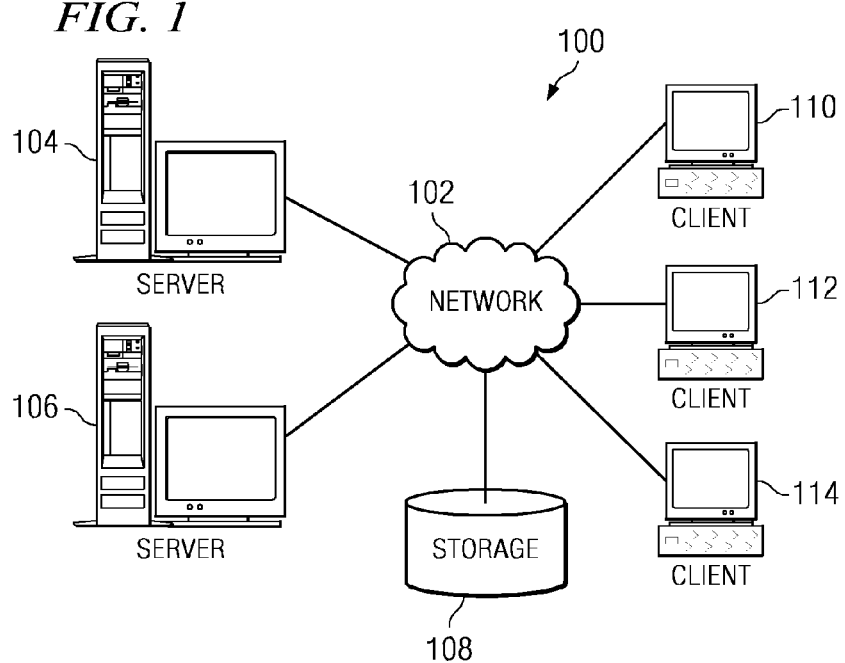
FIG. 1 depicts a pictorial representation of a network of data processing systems, in which illustrative embodiments may be implemented.
Figure 2:
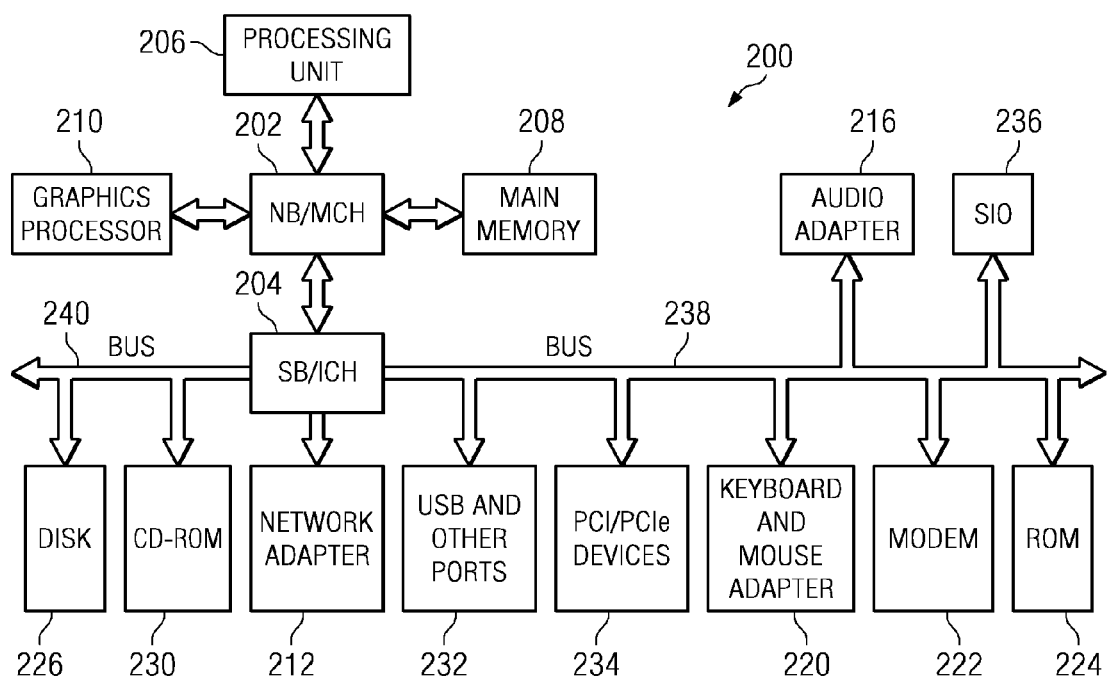
FIG. 2 is a block diagram of a data processing system, in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Introduction

The different embodiments provide a method, apparatus, and computer program product for querying data in a database. An ontology is associated with the data. Responsive to receiving a query from a requester, relational data in the database is identified using the query to form identified relational data. Ontological knowledge in the ontology is identified using the identified relational data and the ontology. A result is returned to the requestor.

Most companies today have large amounts of data stored in relational databases. Typically, this data has been gathered over many years. The company may also have knowledge in a semi-structured form that does not easily lend itself to being stored in relational form. It would be useful for a company to be able to infer new information by storing and querying both the data and knowledge about the data (ontology).

Of course, one way of storing and querying data and ontology is to materialize the ontology and store the resulting relationships. However, materializing the ontology reduces the ontology to relational data and removes the advantages of keeping the ontology in a semi-structured form.

Embodiments solve this problem by using the previously described framework. Class hierarchies, implication rules, and transitive properties are extracted from the ontology and stored in extended markup language, allowing the data and the ontology to be queried. The class hierarchies, implication rules, and transitive properties allow queries to infer knowledge about the data that is not contained in the relational tables, while leaving the ontology in semi-structured form.

Moreover, using this framework, a user can create queries that infer knowledge in a manner similar to how the user would normally create queries for relational data. This reduces any learning curve and allows a user to create queries for inferring knowledge relatively quickly.

An ontology is a model of entities and relationships in a specific domain of knowledge. An ontology that is associated with a set of data elements is knowledge about the data, and is also known as domain knowledge. Domain knowledge is typically knowledge which is obtained from humans who are experts in a particular area and then transformed by knowledge engineers into a set of entities and relationships.

A set of data elements contains one or more data elements. Current database management systems (DBMS) are not able to easily and seamlessly manipulate both the data elements and the associated ontology. It would be useful if the associated ontology could be managed similar to the data, so that users could query the data, query the ontology, and query inferences derived from the data and the ontology, similar to how users query the relational data.

The ability to query data, domain knowledge, and inferences derived from the data and domain knowledge, is called semantic data management. In order to support semantic data management in a database management system, embodiments provide a framework for managing relational data and an associated ontology which bridges the gap between data representation, knowledge representation and inferencing.

The different embodiments provide a method, apparatus, and computer program product for querying data in a database. An ontology is associated with the data. Responsive to receiving a query from a requester, relational data in the database is identified using the query to form identified relational data. Ontological knowledge in the ontology is identified using the identified relational data and the ontology. A result is returned to the requester.

Each ontology element has an associated class. The classes in an ontology may be organized as a class hierarchy, in which the classes are organized in a tree structure. In a class hierarchy, a class that is below inherits one or more properties from the class or classes above it. For example, in a wine ontology, the region where the wine is grown may be a class. Thus, a wine grown in Mendocino, Calif. may be represented in a class hierarchy by showing Mendocino below California and California below the United States.

An implication rule is a rule of logic showing the logical relationship between ontology elements. For example, if a wine is of type Burgundy, then the wine is grown in the region of France. This logical relationship may be written as the following implication rule:

(type=Burgundy)=>(region=France)

In a transitive relationship, if A is related to B, and B is related to C, then it logically follows that A is related to C. For example, if Mendocino is in California, and California is in the United States, then it follows that Mendocino is in the United States.

Overview

With reference now to FIG. 3, a block diagram of a user interaction with a database management system (DBMS), in accordance with an illustrative embodiment, is depicted. In user interaction with a database management system 300, user 302 interacts with database management system DBMS 304. User 302 can perform various operations to DBMS 304, including creating and sending a query to extract information from DBMS 304 and receiving the results of the query from DBMS 304.

DBMS 304 provides a virtual view 306 of base table 308, which is a conventional relational data table, and ontology repository 310. Ontology repository 310 contains one or more ontologies associated with the data in base table 308. The term "ontology" refers to knowledge about the data elements in the relational data table. The knowledge in an ontology is typically less structured than the data elements. For example, a wine database may contain information about each type of wine, the price per bottle, and who makes it. The ontology may contain information such as where the grapes are grown, and the color of the grapes.

Virtual view 306 provides the user with a seamless and integrated view of both the data in base table 308 and a set of ontologies in ontology repository 310. A set of ontologies contain one or more ontologies. Virtual view 306 may appear to the user as a conventional database management system, and so the user may not be aware that he or she is viewing both data and ontology together in the virtual view.

The virtual view is created when the user associates a subset of the data elements in the relational data table with a subset of the ontologies in ontology repository 310. Subset means that the data elements in the virtual view are less than or equal to all the data elements in the relational view, and the ontologies in the virtual view are less than or equal to all the ontologies in ontology repository 310.

User 302 queries DBMS 304 using virtual view 306. Virtual view query processor 312 receives the user's query, rewrites the query, and sends the rewritten query to query engine 314 for processing. Query engine 314 may be a hybrid relational-XML query engine.

Query engine 314 receives the rewritten query, executes the query and obtains information, and then returns the information to the user. The information obtained may be data from base table 308, knowledge from ontology repository 310, or an inference resulting from linking the data in base table 308 with the knowledge in ontology repository 310.

In a conventional database management system, user 302 sends a query to query engine 314, query engine 314 extracts information that matches the query from base table 308, and then sends the result of the query back to user 302. In an illustrative embodiment, ontology repository 310 is added to a conventional database management system so that both the data and the associated set of ontologies may be queried together. In an illustrative embodiment, query engine 314 is modified to handle both a relational data base and a set of ontologies stored as XML files.

In an illustrative embodiment, virtual view 306 is added to a conventional database management system so that user 302 can view both data elements from base table 308 and ontology elements from ontology repository 310. Virtual view query processor 312 is added to a conventional system so that user 302 can query base table 308 and the associated ontologies in ontology repository 310 using the virtual view.

The different blocks in FIG. 3 are for purposes of illustration and not meant to limit the manner in which different features of illustrative embodiments may be implemented. The database management system framework shown in FIG. 3 extends a database management system to operate on not just data, but also domain knowledge, so that inferences from the domain knowledge and data may be made. To insulate the user from the details of the representation of the domain knowledge, the user is presented with a virtual view, through which domain knowledge appears to be no different from data. In this way, domain knowledge may be manipulated using relational operators that are fully incorporated and supported within the database management system. In addition, inferences may be made based on the data and the domain knowledge using relational operators.

TABLE 1

| ID | Type | Origin | Maker | Price |
|---|---|---|---|---|
| 1 | Burgundy | CotesDOr | ClosDeVougeot | 30 |
| 2 | Riesling | NewZealand | Corbans | 20 |
| 3 | Zinfandel | EdnaValley | Elyse | 15 |

Table 1 is a base table, such as base table 308 in FIG. 3, containing relational data for three wines. Each row in Table 1 is associated with a specific instance of a wine. Each wine has four attributes: type, origin, maker, and price. A conventional relational database management system allows a user to query data about the wines using these attributes. However, a user may only query and retrieve the data contained in Table 1.

A human, on the other hand, has the ability to combine data with knowledge and create inferences. For example, if a wine connoisseur is asked which wine originates from the United States (U.S.), the wine connoisseur might answer Zinfandel because its origin, EdnaValley, is located in California. The information that EdnaValley is in California, and California is in the U.S., is not explicitly contained in the data of Table 1, but instead belongs to the domain knowledge of geographical regions.

Similarly, if asked which wine is a red wine, the wine connoisseur might answer Zinfandel and Burgundy, because the wine connoisseur knows that Zinfandel is red and that the Burgundy from Cotes D'Or is red. The wine connoisseur knows that, even though Burgundy can be either red or white, Burgundy wines originating from Cotes D'Or are always red. However, the domain knowledge needed to answer queries that involve an inference is not present in the relational table.

The different embodiments recognize that the first step to answer a query involving an inference to be made is to make the domain knowledge accessible to a computer by extracting information about the ontology, such as the ontology's class hierarchy. For example, a wine ontology may consist of a class hierarchy of objects, properties associated with each object class, and rules governing (a) the objects, (b) the properties of the objects, and (c) the values the properties may take.

Class Hierarchy

With reference now to FIG. 4, a block diagram of a class hierarchy in a wine ontology is depicted in which illustrative embodiments may be implemented. The class hierarchy is extracted from the wine ontology and stored in an ontology repository such as ontology repository 310 in FIG. 3.

Class hierarchy in a wine ontology 400 shows the different types of relationships in a wine ontology. The terms subclass and superclass are used to convey information about the hierarchical relationship between two classes. For example, in a class hierarchy, a class below another class is sometimes called a subclass, while a class above another class is sometimes called a superclass.

In FIG. 4, thing 402 has a subclass potableLiquid 404. PotableLiquid 404 has subclass wine 406. Wine 406 has multiple subclasses, including burgundy 408 and riesling 410. Riesling 410 has two subclasses, dryRiesling 412 and sweetRiesling 414.

Class wine 406 inherits the property locatedIn 416 from superclass thing 402. The property locatedIn 416 takes a value from the class region 418. Class wine 406 has associated with it five properties, hasSugar 420, hasBody 422, hasColor 424, hasMaker 426, and madeFromGrape 428.

Each property is associated with a range class, so that the values of the property are restricted to instances of the range class. For example, the property hasSugar 420 takes values that are instances of the wineSugar 430 class. Similarly, properties hasBody 422, hasColor 424, hasMaker 426, and madeFromGrape 428 take values that are instances of the classes wineBody 432, WineColor 434, Winery 436, and WineGrape 438, respectively.

A class can subsume or be subsumed by other classes. For example, the class Wine 406 subsumes the classes burgundy 408 and riesling 410. Similarly, dryRiesling 412 and sweetRiesling 414 are subsumed by riesling 410. The subsumption relationship creates a hierarchy of classes, typically with a general superclass such as thing 402 at the top and very specific subclasses such as dryRiesling 412 at the bottom.

Implication Rules

With reference now to FIG. 5, rules in a wine ontology are depicted in which illustrative embodiments may be implemented. FIG. 5 provides examples of implication rules extracted from a wine ontology. In present embodiments, implication rules are stored as an implication graph in an ontology repository, such as ontology repository 310 in FIG. 3.

In rules in a wine ontology 500, rule 502 prescribes that all instances of wine in the CotesDOr class have moderate flavor. Rule 504 prescribes that all instances of wine in the CotesDOr class are of type RedBurgundy and have their origin as CotesDOrRegion. Rule 506 prescribes that all instances of wine of type RedBurgundy have type Burgundy and type RedWine. Rule 508 prescribes that all instances of wine of type RedBurgundy have PinotNoirGrape as the madeFromGrape.

Transitive Properties

Figures 6, 7:
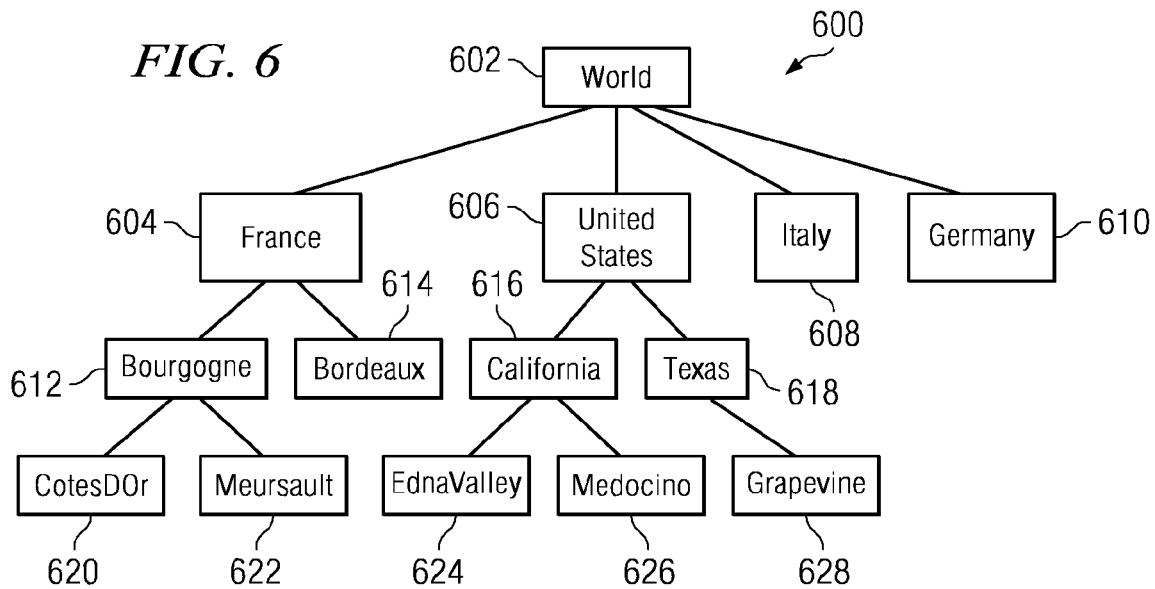
FIG. 6 depicts a class hierarchy for the locatedIn property in accordance with an illustrative embodiment.
FIG. 7 is a diagram depicting database commands in accordance with an illustrative embodiment.

With reference now to FIG. 6, a class hierarchy for the locatedIn property is depicted, in which illustrative embodiments may be implemented. FIG. 6 is an example of a class hierarchy extracted from a wine ontology. The class hierarchy contains transitive properties and is stored in an ontology repository, such as ontology repository 310 in FIG. 3. The class hierarchy for the locatedIn property 600 shows the locatedIn property for region object instances.

France 604, U.S. 606, Italy 608, and Germany 610 are countries located in the superclass World 602. Bourgogne 612 and Bordeaux 614 are regions located in France 604. California 616 and Texas 618 are regions located in U.S. 606. CotesDOr 620 and Mersault 622 are cities located in region Bourgogne 612. EdnaValley 624 and Mendocino 626 are cities located in region California 616. Grapevine 628 is a city located in region Texas 618.

By following the transitive properties, new inferences can be made. For example, CotesDOr 620 is in Bourgogne 612, and Bourgogne 612 is in France 604, so it can be inferred that CotesDOr 620 is in France 604. Similarly, it can be inferred that EdnaValley 624 is in U.S. 606.

The locatedIn property is a property of the thing 402 class in FIG. 4 and takes values that are instances of the Region 418 class in FIG. 4. The wine ontology may specify that the locatedIn property is transitive, so that all the locatedIn relations on region instances form a tree (or a directed acyclic graph).

The domain knowledge shown in FIG. 4, FIG. 5, and FIG. 6 is knowledge extracted from the wine ontology, and this extracted knowledge provides information that supplements the relational data in Table 1. However, the domain knowledge in FIG. 4, FIG. 5, and FIG. 6 is not in relational form, and therefore a conventional relational database management system cannot manage the knowledge extracted from the ontology.

Present embodiments recognize that it is desirable to be able to use a database management system to manage domain knowledge in addition to managing data. First, in many cases, the data already resides in the database management system, and so the database management system is able to provide users with a wide range of transactional and analytical capabilities. Second, a declarative query language such as structured query language (SQL) can insulate users from the details of the data representation.

In order for a user to be able to query a database management system containing data and domain knowledge, present embodiments address two issues. The first issue is storing and accessing the ontology. The second issue is implementing knowledge inferencing, so that knowledge may be inferred using data and ontology. Present embodiments solve both these issues by providing a framework that allows a database management system to query both data and domain knowledge.

Because ontology is structured differently than data, ontology is typically represented as semi-structured data and encoded using an XML-based language such as Resource Description Framework (RDF) or Web Ontology Language (OWL). The relational data model is suited for data containing structured relationships, but is not suited for efficiently storing or processing semi-structured data.

In contrast, the XML data model is better suited for representing semi-structured data. However, XML's flexibility in modeling semi-structured data comes at the cost of storage overhead and query processing overhead, which is why a pure XML database is usually not deployed to handle an ontology. Thus, there is a need to model semi-structured data in way that preserves the semi-structured form of the data and also allows the semi-structured data to be efficiently stored and efficiently queried. Knowledge inferencing, that is, deriving inferences from the data and the associated ontology, is highly complex as it uses many details of the ontology, such as the relationships between the data and the ontology. For example, an ontological relationship may be transitive, and in fact, transitive relationships are often involved in many useful queries. However, a transitive query is difficult to express and often costly, in terms of processing overhead, to execute.

For example, in a relational database management system (RDBMS), transitive relationships may require the execution of a set of recursive SQL queries. Recursive means that a given SQL query is repeatedly broken down into additional SQL queries, typically with each successive query operating on a smaller set of entities.

To efficiently process ontology-based queries in a database management system, one approach is to pre-process the ontology and materialize the transitive closures for all transitive relationships in the ontology. Materialize means that all transitive relationships are discovered and stored. Transitive means if A=B, and B=C, then A=C. For example, to materialize the knowledge that EdnaValley 624 is in the U.S. 606, the transitive relationships used are: (1) EdnaValley 624 is in California 616, and (2) California 616 is in the U.S. 606.

The problem with this approach is that pre-processing all transitive relationships in the ontology incurs a cost in terms of both time and storage, because all transitive relationships have to be followed and then stored. Furthermore, once all transitive closures are materialized, updating the ontology becomes more costly as any change to an ontology relationship may introduce significant changes that are not contained in the materialized transitive relationships.

The database administrator is faced with the dilemma of having to incur the cost of re-processing all transitive relationships or having knowledge in the ontology that cannot be queried because the knowledge has not been materialized. Thus, materializing the ontology defeats the purpose of having an ontology that contains dynamic information and reduces the ontology to data with fixed relationships.

Creating A Framework to Query Data and Ontology

Thus neither a pure relational database management system nor a pure XML-based approach can easily implement a framework for allowing data and ontology to be queried. To solve the problem of using a database management system to manage data and an ontology, embodiments extract specific information from an ontology and use a hybrid relational-XML database management system, such as DBMS 304 in FIG. 3, to store data, the ontology and the extracted information. The framework allows a user to express and process ontology-based semantic queries.

To support ontology-based semantic queries, the relational database management system is augmented so that knowledge representation can be incorporated into the relational framework. Augmenting the relational database management system allows knowledge to be queried in a way similar to how data is queried. In other words, the user can create a query, similar to a conventional relational query, which results in inferences based on the ontology.

The framework provides the user with a relational virtual view of both the data and the domain knowledge, and allows the user to query the data and the domain knowledge. The relational virtual view is a virtual view such as virtual view 306 in FIG. 3. The relational virtual view is created by specifying how the data, encoded in relational tables, such as base table 308 in FIG. 3, relates to the domain knowledge, encoded as one or more ontologies in an ontology repository, such as ontology repository 310 in FIG. 3. Once the data is integrated in this way with the domain knowledge, new knowledge, such as inferences based on the relationships between the data and the ontology, may be derived.

The virtual view is an interface through which users may query data, domain knowledge, or derived knowledge in a seamless and unified manner. To provide the virtual view, embodiments use a database management system capable of native XML support augmented with an ontology repository for managing ontological information.

Before an ontology can be used in the database management system, the ontology's files are first registered with the ontology repository. The ontology files are then pre-processed into a representation more suitable for query processing. Class hierarchies and transitive properties are extracted into trees, and implications are extracted into implication graphs. These trees and implication graphs are encoded and stored as XML data and used to create the virtual view. Once the virtual view is created, SQL queries may be written and executed as if the virtual view was just another relational table.

in the virtual columns are derived (inferred) only when a query is made that requires that the values be derived.

The purpose of the virtual view is to (a) show the user what information can be queried and (b) provide the system with the relationships between the data and the ontology needed to derive values. The system is able to use virtual columns to derive values from the raw data and the ontology when needed, in real time. A unified view of the data and the ontology makes it relatively easy for users to make queries that manipulate both the data and the ontology.

With reference now to FIG. 7, a diagram depicting database commands, in which illustrative embodiments may be implemented, is depicted. Query 702 is a query against a virtual view, such as virtual view 306 in FIG. 3. Query 702 finds all wines in the database which originate from the United States. Similarly, the query 704 is a query against the virtual view which finds all red wines in the database.

From a purely relational database standpoint, the schema shown in Table 2 appears to violate relational normal forms because, for example, one location may be a sub-region of many other locations. For example, for a given wine, the set of

TABLE 2

| ID | Type | Origin | Maker | Price | locatedIn | hasColor |
|---|---|---|---|---|---|---|
| 1 | Burgundy | CotesDOr | ClosDeVougeot | 30 | {Bourgogne, France} | Red |
| 2 | Riesling | NewZealand | Corbans | 20 | { } | White |
| 3 | Zinfandel | EdnaValley | Elyse | 15 | {California, U.S.} | Red |

Table 2 shows a virtual view, such as virtual view 306 in FIG. 3, in which Table 1 has been augmented with two virtual columns, locatedIn and hasColor. The virtual view displays information from a base table alongside related information extracted from an ontology. The first five columns of Table 2, ID, Type, Origin, Maker, and Price, are taken from a base table such as base table 308 in FIG. 3. The two virtual columns, locatedIn and hasColor are taken from extracted ontology information stored in an ontology repository, such as ontology repository 310 in FIG. 3.

LocatedIn consists of a set of locations, $\{Y_1, Y_2, \ldots y_n\}$, where, for every wine of Origin x, x is a sub-region of $y_i$. For example, wine Burgundy originates from CotesDOr, which is a sub-region (subclass) of Bourgogne, which in turn is a sub-region of France. Thus, by following the transitive relationships in the region hierarchy, the value of locatedIn for Burgundy is found to be Bourgogne, France.

Similarly, the virtual column hasColor is derived from the wine ontology. The ontology includes a set of implication rules, such as, for example:

(type=Zinfandel)=>(hasColor=red)

(type=Riesling)=>(hasColor=white)

The symbol "=>" denotes that the left hand side (LHS) of the symbol "=>" implies the right hand side (RHS), as in "A wine of type Zinfandel implies the wine has the color red". The symbol "=>" may also be read as an "If . . . then . . . " statement, as in "If a wine is of type Zinfandel then the wine has the color red". Thus, for wines of type Zinfandel, we can derive the value of hasColor to be red.

Any number of virtual columns may be appended to the original table, Table 1. The virtual view incorporates both the data and the domain knowledge associated with the data. However, because it is a virtual view, none of the values in the virtual columns are actually materialized. Instead, the values locatedIn values depends on the origin of the wine, and so the two columns titled "Origin" and "locatedIn" could be isolated and made into their own table.

However, the schema of Table 2 may violate the relational normal form because Table 2 is merely a virtual view. The virtual view allows a database user to query the data and the domain knowledge as if they were stored in relational tables.

For example, suppose there is a "knowledge" table called RegionKnowledge(region, superRegions), which stores, for each region, all super regions as a set. Thus, (CotesDOr, {Bourgogne, France}) is an example of an entry in this knowledge table. From a user's perspective, the virtual view appears to be the result of joining the wine table with a "knowledge" table as shown in command 706.

It is important to note that command 706 is never actually executed to join the wine table with a knowledge table, but represents what the virtual view shows the user. The virtual view does not in fact exist in the system as a materialized table, because the data and ontology are never "joined" together, even at the time the query is made. A virtual view is thus significantly different from a traditional view because the "knowledge" table used to create the view does not actually exist.

Instead, the system understands how to derive the values of the virtual columns from the values in the base table by, for example, reasoning over the ontology. Reasoning over the ontology means that values of the virtual columns are filled automatically when a query is issued against the virtual view. The process of creating a virtual view informs the system as to how the values for the virtual columns are derived. This is discussed in more detail below.

Integrating Relational Tables and Ontology

Underlying the virtual view is the data and the associated ontology. The data is stored in relational tables while the ontology is stored in XML. When properly associated together, the data and the ontology may be queried through the virtual view to produce new knowledge in the form of inferences. The data and the ontology are associated using a CREATE VIRTUAL VIEW statement, one of the language extensions in the illustrative embodiments used to support semantic queries in a database management system.

With reference now to FIG. 8, a diagram depicting a virtual view command, in which illustrative embodiments may be implemented, is depicted. Virtual view command 800 creates a virtual view, such as virtual view 306 in FIG. 3, which integrates a base table, such as base table 308 in FIG. 3, with an ontology in an ontology repository, such as ontology repository 310 in FIG. 3. FIG. 8 shows how the virtual view in Table 2 is created from Table 1 and an associated ontology.

A virtual view, such as virtual view 306, is registered with a database management system, such as DBMS 304 in FIG. 3. Here, in line 802, CREATE VIRTUAL VIEW is used to register the virtual view WineView with the database management system. CREATE VIRTUAL VIEW associates a wine table with an ontology. After the virtual view is registered, a user, such as user 302 in FIG. 3, may issue queries against the virtual views as if the data and ontology were in a relational table.

CREATE VIRTUAL VIEW statement is a type of join operation between the wine table and the ontology. One way to understand the join operation is to view the ontology hierarchy as a class hierarchy in an object-oriented programming language, and view the join operation as using data from the relational table to instantiate new objects.

The source of the virtual view WineView is the Wine table and the WineOntology, which are specified in the FROM clause in line 804. The constraints in the WHERE clause in line 806 specify how the wine table and the wine ontology are integrated. The constraint O.object=W.type in line 806 instantiates an ontology object using the value of W.type.

For example, the first row in Table 1 is for a wine of type Burgundy. The constraint becomes O.object='Burgundy'. In line 808 O.object.isA ('Wine') is true and so the line 808 requires that the newly instantiated object be an instance of the Wine class. This maps each row of the wine table to an instance of Wine in the wine ontology.

Line 810 specifies that the origin column of the wine table corresponds to Burgundy's locatedIn attribute (which is inherited from class Thing). Line 812 specifies that the maker column corresponds to the wine's hasMaker attribute. Note that O.object.hasMaker is only meaningful when O.object is an instance of the Wine class. Thus, the result of the CREATE VIRTUAL VIEW statement is a schema that includes two virtual columns, locatedIn and hasColor created from the associated ontology.

The SELECT in line 802 has three parameters. Item W.* indicates that the schema of the virtual view contains all the columns (Id, Type, Origin, Maker, Price) in the original wine table (Table 1). TC (O.object.locatedIn,'subRegion') in line 802 specifies another virtual column whose value is computed by the transitive closure function TC. The transitive closure function expands a region upward along the 'subRegion' relationship in the location ontology, resulting in a set of locations that contain the region specified by O.object.locatedIn in line 802.

Item O.object.hasColor in line 802 specifies a virtual column based on an attribute or property of the wine object in the ontology. The attribute value is derived using ontological rules at the time the query is made. The registration of the virtual view creates a mapping between values in the relational table and the ontology, enabling the system to perform knowledge inferencing for queries against the virtual view.

The ontology is stored as semi-structured data in an ontology repository, such as ontology repository 310 in FIG. 3. As previously discussed, a conventional relational database management system cannot directly handle semi-structured data. The framework uses a hybrid relational-XML database management system, such as DBMS 304 in FIG. 3, to provide physical level support for the ontology. Because XML is now a standard for data retrieval and exchange, some relational database management systems now support XML data in native form. For example, International Business Machines' (IBM) DB2™ Universal Database provides native support for XML data.

The framework uses a hybrid relational-XML database management system, such as IBM's DB2™, where an existing relational database management system has been extended using the following four components. First, an ontology repository, such as ontology repository 310 in FIG. 3, is added to provide native XML storage so that an XML document can be stored as an instance of the XQuery Data Model (QDM), that is, as a structured, typed, binary tree. Second, new index types for XML data are created, including structural indexes, value indexes, and full-text indexes. Third, a hybrid query processor, such as virtual view query processor 312 in FIG. 3, is added to process queries formulated using XQuery and SQL. Fourth, an enhanced query engine, such as query engine 314 in FIG. 3, is added to support XQuery and SQL/X operators.

In a hybrid relational-XML database management system, XML is supported as a basic data type. Users can create a table with one or more XML type columns. A collection of XML documents can therefore be defined as a column in a table.

With reference now to FIG. 9, commands to a hybrid relational-XML database, in which illustrative embodiments may be implemented, are depicted. Line 902 shows a command a user can use with a hybrid relational-XML database to create a table ClassHierarchy. Line 904 shows sample code a user can use to insert an XML document into a table. The XML document is parsed, placed into native XML storage, and indexed. The SQL/X function, XMLParse, is used to insert an XML document into a table.

A user can query relational columns and XML columns together by issuing a SQL/X query. Line 906 is an example of a query which returns the class ids and class names of all the class hierarchies that contain the XPath/Wine/DessertWine/ SweetRiesling.

XMLExists is a SQL/X boolean function that evaluates an XPath expression on an XML value. If XPath returns a non-empty sequence of nodes, then XMLExists is true, otherwise, it is false.

Ontology Repository

In order to support ontologies in the database management system, the database management system, such as DBMS 304, is augmented with an ontology repository, such as ontology repository 310 in FIG. 3. An ontology repository consists of a collection of information associated with one or more ontologies, ontologies which a user has registered with the ontology repository.

From the user's perspective, the ontology repository contains one or more ontology files and their corresponding identifiers (ontIDs). Besides being a storage system for ontology files, the ontology repository also hides much of the complexity of the ontology-related processing from the user.

With reference now to FIG. 10, a block diagram depicting a user interaction with an ontology repository, in which illustrative embodiments may be implemented, is depicted. In user interaction with an ontology repository 1000, user 1002 provides one or more ontology files 1004 and an ontology identifier 1006 to ontology repository 1008. Ontology repository 1008 is an example of ontology repository 310 in FIG. 3.

Ontology processor 1010 registers ontology files 1004 to ontology identifier 1006 so that the user can later reference that specific ontology. More than one ontology file may be registered to a specific ontology identifier. Multiple sets of ontologies may be registered, with each ontology having a unique ontology identifier. Ontology processor 1010 performs various operations on ontology files 1004, including extracting a variety of information from the ontology in order to facilitate query processing.

For example, ontology processor 1010 may extract from ontology files 1004 the ontology's class hierarchy 1012, transitive properties 1014, and implication graph 1016. Class hierarchy 1012, transitive properties 1014, and implication graph 1016 are stored in ontology repository 1008. Ontology processor 1010 may extract additional information to, for example, support specific query types, or to optimize query processing. Ontology processor 1010 stores the extracted information in ontology repository 1008. Ontology processor 1010 may also store the original files, ontology files 1004, in ontology repository 1008.

Figures 11, 12:
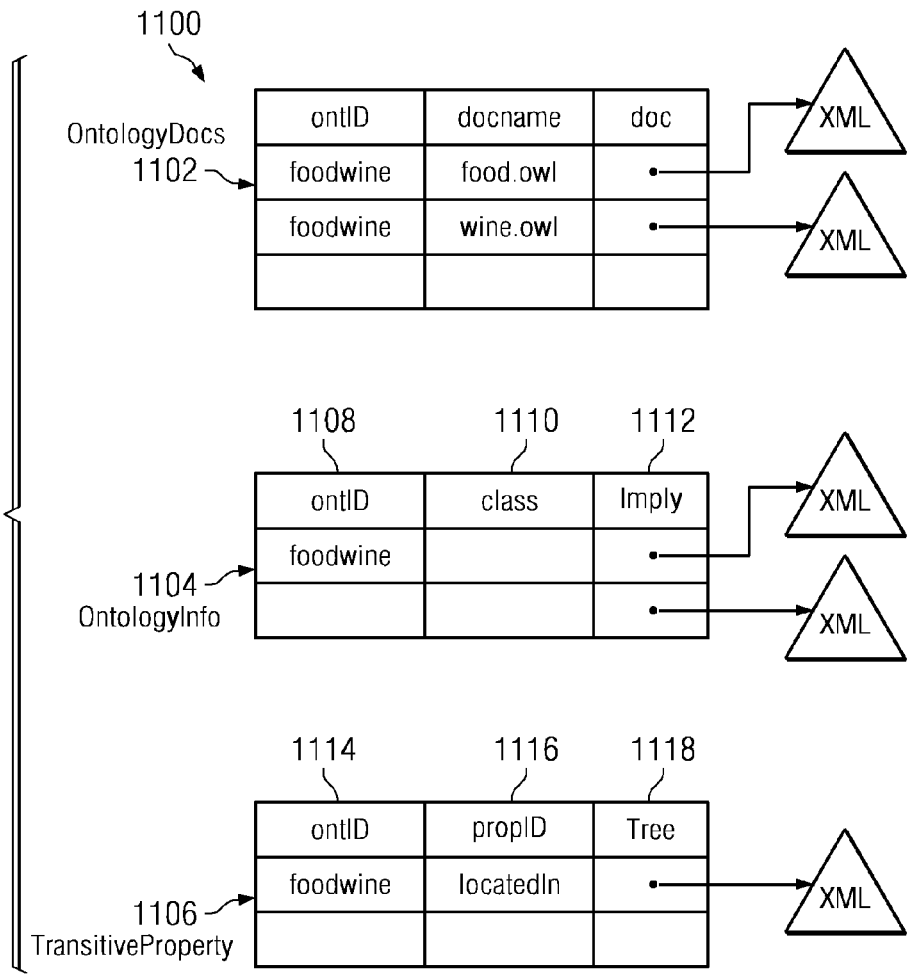
FIG. 11 is a block diagram depicting extracted information, in accordance with an illustrative embodiment.
FIG. 12 is an example of code for constructing a Wine class hierarchy in accordance with an illustrative embodiment.

With reference now to FIG. 11, a block diagram depicting extracted information, in which illustrative embodiments may be implemented, is depicted. Extracted information 1100 shows an example of the three types of ontology information that may be extracted and stored in an ontology repository, such as ontology repository 1008 in FIG. 10.

Here, the three types of extracted information are stored in three tables, OntologyDocs 1102, OntologyInfo 1104, TransitiveProperty 1106, in the ontology repository. OntologyDocs 1102 table stores a copy of the original ontology files which the user registered. Tables OntologyInfo 1104 and TransitiveProperty 1106 store additional information extracted from the ontology files. Some of the fields of each table may contain pointers to XML representations of the documents or the extracted information.

Here, the extracted ontology information is shown stored in tables for illustration purposes. Those versed in the art will appreciate that any type of data structure, that serves the same purpose as a table, may be used to store the extracted ontology information.

OntologyInfo 1104 table may contain various fields such as ontology identifier ontID 1108, class 1110, and imply 1112. Here, class 1110 contains information on each class in an ontology, while imply 1112 has fields containing information about the implications associated with each class.

Similarly, TransitiveProperty 1106 has various fields, including ontology identifier ontID 1114, property identifier propID 1116, and tree 1118. PropID 1116 contains information about each property, while tree 1118 is a field which contains a pointer to an XML tree representation of one of the transitive properties in the ontology.

The next section describes how the user can register an ontology with or remove (drop) an ontology from an ontology repository, such as ontology repository 1008 in FIG. 10, and how ontology processor 1010 in FIG. 10, extracts various information such as the class hierarchies, transitive properties, and implication graphs from the ontology files. The examples use ontologies encoded as web ontology language (OWL) files, but it should be understood that the different embodiments are not restricted to ontologies encoded using any specific ontology language.

The ontology repository provides a user interface for a user to manage ontology files. The user supplies a unique ontology identifier (ontID) to identify each unique ontology. Each ontology may be encoded into one or more ontology files. The ontology repository's interface allows a user to register one or more ontology files as part of an ontology, and delete one or more of the files associated with an ontology.

For example, a user interface for an ontology repository might provide a procedure registerOntology(ontid, ontology_File) that allows a user to register an ontology file using a unique identifier. If the logical ontology consists of several ontology files, the user can call the register procedure with the same ontID, for each file in the ontology. All ontology files registered with the same ontID are grouped together internally for the extraction of the class hierarchies, transitive properties, and implication graphs. To remove a registered ontology in the repository, the drop ontology procedure dropOntology(ontid) can be used to delete the ontology files and the extracted information files associated with the specified ontology ID.

Once the user has finished registering all the files associated with an ontology, the ontology files are parsed to extract various pieces of information, such as the class hierarchies, transitive properties, and the implication graph. The extracted pieces of information are used to facilitate query rewriting and processing.

Class Hierarchies

The following describes how class hierarchies may be extracted from an ontology. The subclass relationship that specifies class hierarchies can be expressed in several different ways using web ontology language (OWL). Moreover, the subclass hierarchies that are captured may not necessarily be disjoint. Class hierarchies are extracted from ontology files by an ontology processor, such as ontology processor 1010 in FIG. 10, and stored in an ontology repository, such as ontology repository 1008 in FIG. 10.

With reference now to FIG. 12, an example of code for constructing a Wine class hierarchy is depicted. Line 1202 provides an example of how a Wine class hierarchy may be constructed by explicitly specifying subclasses in a subClassOf construct using web ontology language.

With reference now to FIG. 13, a block diagram of a class and sample code is illustrated. First, the Wine class hierarchy is extracted and initially represented as shown in FIG. 1302, with DessertWine 1304 a subclass of Wine 1306.

Second, the subclass relationship is implicitly specified using restrictions. For example, consider the web ontology language fragment of line 1308, where the WhiteWine class is defined to be all wines whose hasColor attribute has the value white.

The definition in line 1308 implies a subclass relationship between Wine and WhiteWine and so the corresponding edge may now be added into the class hierarchy as illustrated in 1310, with DessertWine 1312 and WhiteWine 1314 as subclasses of Wine 1316.

Third, subclass relationships are expressed using binary set relations such as, for example, the intersection operator or the union operator. Line 1318 shows an example of web ontology language in which WhiteBurgundy is defined as the intersection of Burgundy and WhiteWine. Therefore, WhiteBurgundy is a subclass of both Burgundy and WhiteWine, and the class hierarchy now appears as shown in class hierarchy 1320. In class hierarchy 1320, WhiteBurgundy 1322 is a subclass of Burgundy 1324, WhiteBurgundy 1326 is a subclass of WhiteWine 1328, and Burgundy 1324 and WhiteWine 1328 are both subclasses of Wine 1330.

In a hierarchical diagram, such as class hierarchy 1320, each class, such as Wine 1330, is called a node, while the line between a class and a subclass is called an edge. For example, the line between Burgundy 1324 and WhiteBurgundy 1322 is an edge.

In this representation, each node represents a class, while each edge represents a subclass-of relationship. The subclass-of relationship is transitive and so if A→B→C exists in the class hierarchy, then the following subsumption statement holds for a given instance of x: (x∈A)=>(x∈B)=>(x∈C).

For example, here, WhiteBurgundy 1322 is a subclass of Burgundy 1324, and Burgundy 1324 is a subclass of Wine 1330, so WhiteBurgundy 1322 is transitively a subclass of Wine 1330. Moreover, any subclass of WhiteBurgundy 1322 will always be a subclass of Wine 1330.

Transitive Properties

Besides class hierarchies, an ontology processor, such as ontology processor 1010 in FIG. 10, also extracts transitive relationships from the ontology and stores the transitive relationships in the form of a tree to facilitate query re-writing and processing. The transitive properties are typically stored in XML form in an ontology repository, such as ontology repository 1008 in FIG. 10.

With reference now to FIG. 14, an example of code for specifying transitive properties of a Wine ontology is depicted. Code segment 1402 is an example of web ontology language (OWL) code for specifying that the binary relationship (owl:ObjectProperty) is transitive. In this example, the locatedIn property relates the Thing class to the Region class and is defined to be transitive. Transitive means:

locatedIn(a, b) ∧ locatedIn(b, c)=>locatedIn(a, c)

During extraction, once the ontology processor discovers that the locatedIn property is transitive, all instances of that property are scanned and a tree or forest is constructed from the extracted information. For example, code segment 1404 shows extracted instances of the locatedIn property. Based on the properties of code segment 1404, transitive tree 1406 may be constructed. Here, all internal nodes must be instances of the Region class. The leaf nodes need only be instances of the Thing class. All the edges denote subsumption via transitivity of the locatedIn property.

Implications

An ontology processor, such as ontology processor 1010 in FIG. 10, also extracts implications from the ontology in the form of rules such as A=>B. The implication rules are stored in the form of an implication graph. The implication graph is stored in an ontology repository, such as ontology repository 1008 in FIG. 10. The implication graph enables knowledge to be inferred from the data and the ontology.

An important type of implication is class subsumption. A transitive tree may be used to capture implications related to class subsumption. Implications other than class subsumptions are general implications that do not involve subsumption via class memberships or transitive relationships.

There are three types of general implications: complex, conjunctive and disjunctive implications. The ontology repository constructs and stores an implication graph for all the general implications in the ontology. The implication graph is used during query processing to rewrite the query.

Complex Implications

Complex implications are implications where the left hand side (LHS) is a conjunction or disjunction of clauses. Take for example, the following web ontology language fragment, where the symbol <=> indicates equivalency: (x∈WhiteWine) <=>(x∈Wine) ∧ (x.hasColor=White) In this example, the last implication is a complex implication, because the left hand side is a conjunction of the two clauses (x∈Wine) and (x.hasColor=White).

Conjunctive Implications

With reference now to FIG. 15, an example of a conjunctive implication is depicted. A conjunctive implication is an implication where the right hand side (RHS) is a conjunction of clauses. A conjunctive implication may be part of an implication graph that is extracted by an ontology processor, such as ontology processor 1010 in FIG. 10, and stored in an ontology repository, such as ontology repository 1008 in FIG. 10.

In code segment 1502, all instances of the Zinfandel class also belong to the subclass of all wines whose hasColor property takes the value red, and to the subclass of all wines whose hasSugar property takes the value dry:

(x∈Zinfandel)=>[(x.hasColor=Red) ∧ (x.hasSugar=Dry)]

"If wine x is a Zinfandel, then wine x is red and wine x is dry." An important property of conjunctive implications is that they can be decomposed into a conjunction of simple implications.

For example, the conjunctive implication above can be decomposed into the following:

[(x∈Zinfandel)=>(x.hasColor=Red)]

∧ [(x∈Zinfandel)=>(x.hasSugar=Dry)]

"If wine x is a Zinfandel, then wine x is red, and if wine x is a Zinfandel, then wine x is dry." By decomposing conjunctive implications into a conjunction of simple implications, conjunctive implications may be processed as a collection of simple implications that are all joined by conjunction.

Disjunctive Implications

A disjunctive implication may be part of an implication graph that is extracted by an ontology processor, such as ontology processor 1010 in FIG. 10, and stored in an ontology repository, such as ontology repository 1008 in FIG. 10. A disjunctive implication is an implication rule whose right hand side is a disjunction of clauses.

With reference now to FIG. 16, an example of a disjunctive implication is depicted. The code segment 1602 illustrates how the implication rule:

(x∈Zinfandel)=>(x.hasBody=Full) ∧ (x.hasBody=Medium)

"If wine x is a Zinfandel, then x has a body that is full or x has a body that is medium" may be encoded in web ontology language (OWL).

Implication Graph

An implication graph is extracted by an ontology processor, such as ontology processor 1010 in FIG. 10, and stored in an ontology repository, such as ontology repository 1008 in FIG. 10. An implication graph is a directed graph consisting of two types of vertices, clause and operator, and two types of edges, imply and operand. Clause vertices denote clauses, such as x.hasBody=Medium, that have truth values. Operator vertices denote the conjunction or disjunction operator.

An operator vertex is also associated with a truth value that is dependent upon the clause vertices that it joins together via either a conjunction or disjunction. Imply edges denote the implication relationship between vertices. Operand edges associate clause vertices to operator vertices.

With reference now to FIG. 17, a block diagram of an implication graph of an illustrative embodiment is depicted. An implication graph for an ontology is constructed by starting with an empty implication graph and then scanning the ontology files for all implications. In FIG. 17, implication graph 1702 is the graphical representation for the set of implications 1704.

When extracting implication rules from the ontology, the ontology processor filters out implications associated with class hierarchies and transitive properties, leaving only the general implications. The ontology processor then iterates through each general implication, and classifies the implication as either complex, conjunctive, or disjunctive. If the implication is conjunctive, the conjunctive implication is further decomposed into a set of simple implications. Finally, vertices and edges corresponding to the current implication are inserted into the implication graph.

The class hierarchies, transitive properties, and implication graphs are extracted from the ontology, and then serialized into extended Markup Language (XML) and stored in an ontology repository, such as ontology repository 1010 in FIG. 10. Serialization is the process of saving an object onto a storage medium. The class hierarchies and transitive properties all contain subsumption relationships in a tree data structure. Because the query processing component relies on XPath for subsumption checking, the tree data is serialized in a way that preserves the tree structure in XML.

With reference now to FIG. 18, an example of a class hierarchy is depicted. Tree 1802 may be encoded into the XML code 1804. When serializing the implication graph, subsumption testing is not needed, and so any standard method for encoding graphs to XML may be used.

With reference now to FIG. 19, a flow diagram of an ontology processor, in which illustrative embodiments may be implemented, is depicted. An ontology processor, such as ontology processor 1010 in FIG. 10, initially receives one or more ontology files and an ontology identifier (step 1902).

The ontology processor registers the ontology files with the ontology identifier (step 1904). The ontology processor extracts and stores the class hierarchy or hierarchies from the ontology files (step 1906). The ontology processor extracts and stores the transitive properties from the ontology files (step 1908). The ontology processor extracts and stores the implication graph from the ontology files (step 1910).

Typically, the ontology processor will store the class hierarchies, transitive properties, and implication graphs extracted in steps 1906, 1908, and 1910, respectively, as a combination of tables and XML data, such as OntologyDocs 1102, OntologyInfo 1104, and TransitiveProperty 1106 in FIG. 11.

With reference now to FIG. 20, a flow diagram for extracting a class hierarchy, in which illustrative embodiments may be implemented, is depicted. A class hierarchy, such as the class hierarchy depicted in FIG. 4, is extracted from an ontology (step 2002). The subclass relationships are specified using restrictions (step 2004). The subclass relationships are specified using binary set relations such as intersection and union operators (step 2006).

With reference now to FIG. 21, a flow diagram for extracting transitive properties, in which illustrative embodiments may be implemented, is depicted. Transitive properties, such as the transitive properties depicted in FIG. 6, are extracted from the ontology (step 2102). The ontology is scanned for all instances of the transitive property (step 2104). A transitive tree is constructed to show the transitive properties of the ontology (step 2106).

Figure 22:
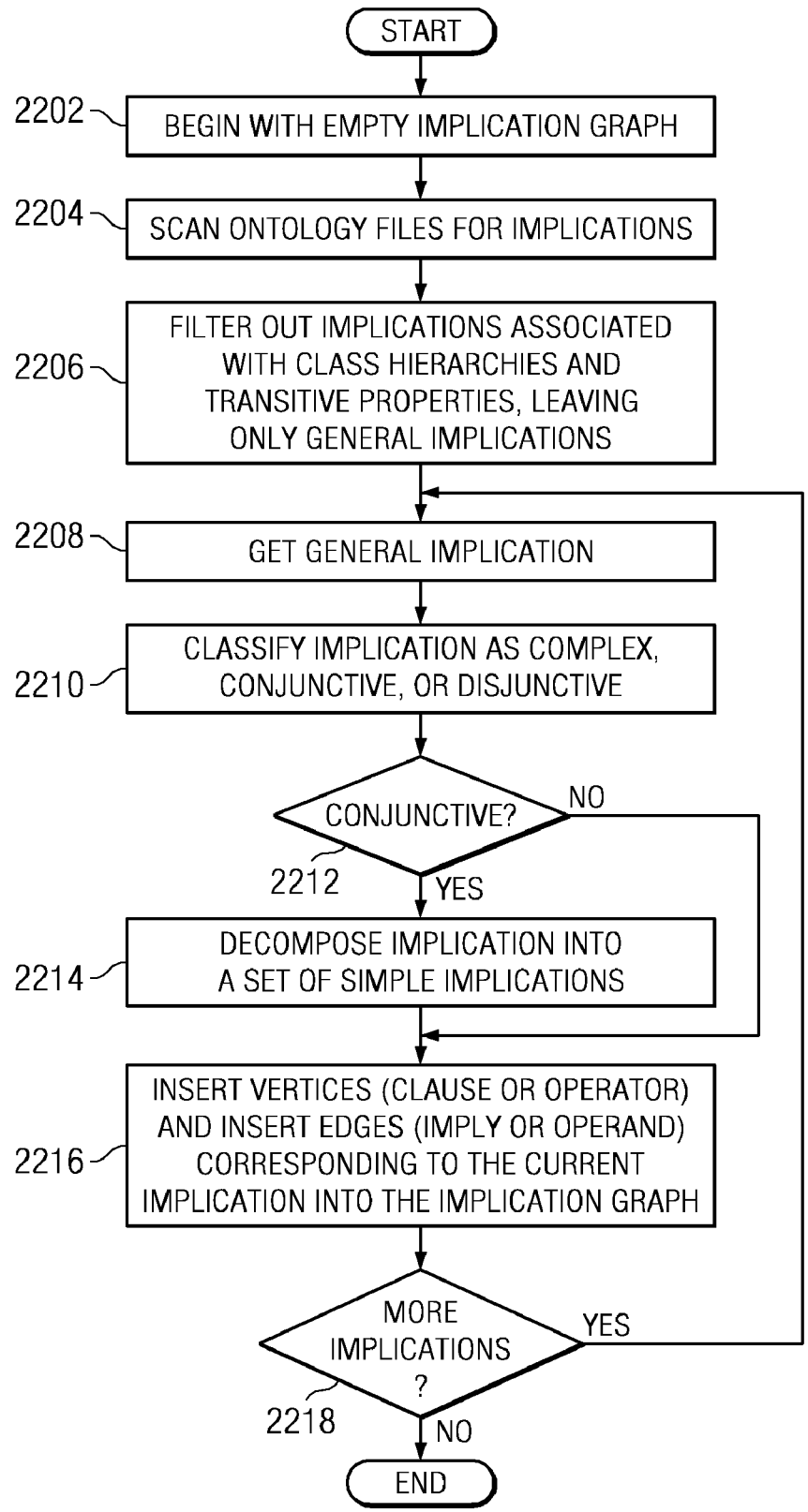
FIG. 22 is a flow diagram for constructing an implication graph in accordance with an illustrative embodiment.

With reference now to FIG. 22, a flow diagram for constructing an implication graph, in which illustrative embodiments may be implemented, is depicted. An empty implication graph is used as the starting point (step 2202).

The ontology is scanned for implications (step 2204). Implications associated with class hierarchies and transitive properties are filtered out, so that only general implications are left (step 2206). One of the general implications is chosen (step 2208). The implication is classified as complex, conjunctive, or disjunctive (step 2210).

If it is determined that, yes, the implication is conjunctive (step 2212), then the implication is decomposed into a set of simple implications (step 2214). If it is determined that, no, the implication is not conjunctive (step 2212), or after the implication is decomposed into a set of simple implications (2214), vertices and edges that correspond to the current implication are inserted into the implication graph (step 2216). If there are more implications (step 2218) then another general implication is chosen (step 2208). If there are no more implications (step 2218) then the operation ends.

Figure 23:
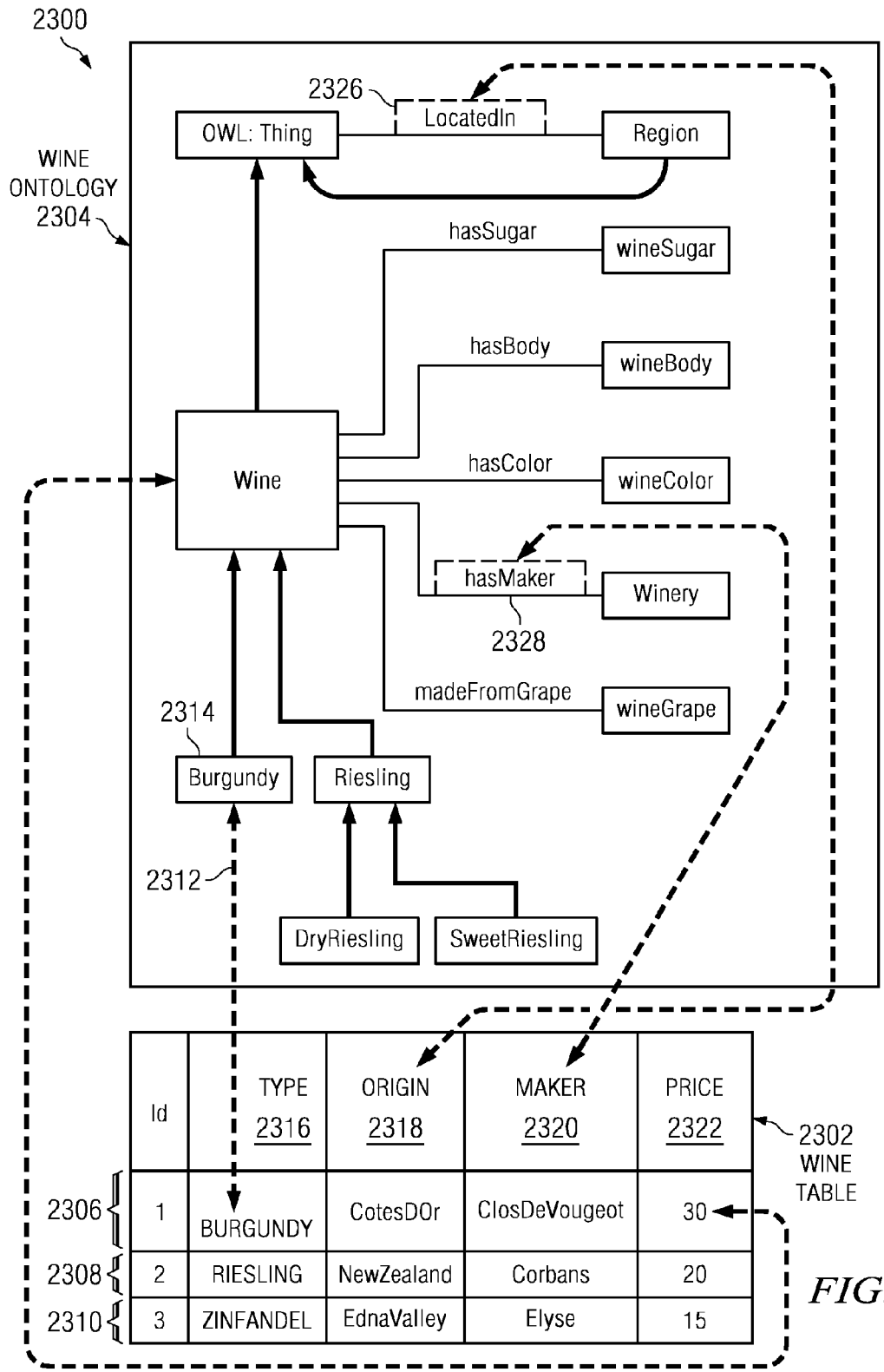
FIG. 23 is a base table of wine products and an associated wine ontology in accordance with an illustrative embodiment.

With reference now to FIG. 23, a base table of wine products and an associated wine ontology is depicted in which illustrative embodiments may be implemented. In base table of wine products and an associated wine ontology 2300, wine table 2302 is associated with wine ontology 2304.

One way of associating wine table 2302 with wine ontology 2304 is to ensure that the column names of wine table 2302 are consistent with the property names used in wine ontology 2304. The column names are also known as the relational attributes.

Another way of associating wine table 2302 with wine ontology 2304 is for the user to provide a mapping of the relational attributes to the associated properties in wine ontology 2304. Each row from wine table 2302 is associated with an entity in the ontology.

The above two techniques may also be combined. For example, some column names of wine table 2302 may be named the same as the property names used in wine ontology 2304, while the remaining columns of wine table 2302 may be associated with wine ontology 2304 by providing a mapping of the relational attributes to the associated properties in the ontology.

In FIG. 23, each row 2306, 2308, and 2310 of wine table 2302 is associated with an instance of the entity wine class. For example, arrow 2312 shows that the type Burgundy in row 2306 is associated with the wine class Burgundy 2314 in the class hierarchy.

Similarly, columns 2316, 2318, 2320, and 2322 of wine table 2302 may be associated with properties in wine ontology 2304. For example, the origin attribute, column 2318, is associated with the property locatedIn 2326 of wine ontology 2304. The maker attribute, column 2320, is associated with the property hasMaker 2328 property of wine ontology 2304.

Processing a Query

A query processor evaluates the predicate of the query for every row in the base table and returns the row or rows that satisfy the predicate. Each predicate eliminates one or more rows from the base table. If the query processor determines that a row does not satisfy a predicate, the query processor moves on to the next row in the base table. Typically, predicate evaluation is straightforward. Values of interest are successively extracted from each row in the base table and evaluated against the predicate to determine whether the predicate is satisfied.

Referring now to FIG. 24, a flow diagram of a processor in which illustrative embodiments may be implemented, is depicted. A query processor, such as virtual view query processor 312 in FIG. 3, receives a query from a user. The query processor rewrites the query so that the query may be processed by a relational-xml hybrid database, such as query engine 314 in FIG. 3.

If the query may be answered using data contained in a base table, such as base table 308 in FIG. 3, then the query is processed conventionally, that is, the query is processed as a query to a relational database. However, if the query requires an inference using the ontology, then the query processor rewrites the query. FIG. 24 illustrates the steps the query processor takes when rewriting the query.

Given a query with a predicate involving attributes not in the base table, the query is rewritten in two stages. First, the query predicate is expanded using the implication graph (steps 2402-2408). Second, each clause is rewritten to include subsumption checking (steps 2410-2414).

The process of rewriting the query begins by searching the implication graph for matching sub-graphs (step 2402). Implication graph 1702 in FIG. 17 is an example of an implication graph. The query predicate may consist of a single clause, or multiple clauses.

If the query predicate in step 2402 consists of a single clause q, then the implication graph is searched for the vertex for q. The query predicate is then rewritten as follows. From the vertex for q, all dependent clauses, that is, all vertices are enumerated from the graph, and the query predicate is rewritten as a disjunction of the original predicate and all of its dependent clauses (step 2404).

If the query predicate in step 2402 consists of multiple clauses joined by a disjunction or a conjunction, then the implication graph is searched for a collection of matching sub-graphs. For each matching sub-graphs, the implication graph is traversed starting from the sub-graph and all the dependent clauses are retrieved (step 2404).

Once all the dependant clauses of the matching sub-graph have been enumerated, any duplicate dependent clauses are eliminated by keeping track of which vertices have been traversed before and removing duplicate traversals (step 2406).

Once a sub-graph has been processed, the query processor checks whether there is another matching sub-graph (step 2408). If the answer is "yes" and there is another sub-graph, then the query processor goes back and repeats the previous steps (steps 2404 and 2406) until all sub-graphs have been processed. If the answer is "no" and there are no more sub-graphs, then the predicate is rewritten as a disjunction of the predicate itself and all the dependent clauses (step 2410).

Next, each dependant clause in the expanded predicate is rewritten using a subsumption predicate. After the query expansion, the query predicate is a Boolean expression of multiple clauses. Each clause is examined to determine if the clause contains a subsumption relationship. If a clause has a subsumption relationship, the clause is rewritten to include a subsumption predicate (step 2412).

If there is another clause in the expanded query, the previous step is repeated (step 2414). If there are no more clauses then the process ends.

With reference now to FIG. 25, an example of a query is depicted in which illustrative embodiments may be implemented. For query 2502, the two relevant implications from the ontology are implications 2504. Query 2502 may be expanded using the implications 2504 into expanded query 2506.

After expansion, each clause is examined to determine whether there is an associated subsumption, and if there is a subsumption, the clause is rewritten. One way of performing subsumption checking is by using the Xpath and the SQL/XML function XMLExists.

With reference now to FIG. 26, an example of a query is depicted in which illustrative embodiments may be implemented. Query 2602 is a query against Table 2, in which locatedIn is a virtual column created from the transitive closure of W.origin. Query 2602 may be rewritten as query 2604.

In query 2604, XMLExists(T.tree//USRegion//W.origin) performs subsumption checking using the Xpath and the SQL/XML function XMLExists. Of course, those versed in the art will appreciate that other, similar, ways of performing subsumption checking may be used instead of the SQL/XML function XMLExists.

With reference now to FIG. 27, an example of a query is depicted in which illustrative embodiments may be implemented. Referring again to Table 2, query 2702 is a query against Table 2. Assume that the implication graph of the ontology contains implications 2704 relevant to "hasColor=red". Assume also that class hierarchy 2706 is a portion of the class hierarchy in the ontology.

The query predicate contains a constraint on hasColor, and hasColor is a virtual column that is not in the base table, therefore the query is expanded using implications 2704 to create expanded query 2708. The type attribute B.type is associated with a recursive type hierarchy in the ontology, and so subsumption checking is applied to create rewritten query 2710.

Processing rewritten query 2710 on Table 2 using the relational-XML hybrid database, the row for CotesDOr will satisfy the query because it is a RedWine, and the row for Zinfandel will also satisfy the query. The isSubsumed( ) function is implemented using the SQL/XML function XMLExists because the class hierarchies are encoded as an XML tree.

Thus, a user can formulate an ontology-based query, similar to a conventional relational query, and have it answered. By rewriting the user's query in the manner described above, and by using information extracted from the ontology, such as the implications, transitive properties, and class hierarchies, the user's query can be used to infer knowledge not in the relational base tables.

The different embodiments provide a method, apparatus, and computer program product for querying data in a database. An ontology is associated with the data. Responsive to receiving a query from a requester, relational data in the database is identified using the query to form identified relational data. Ontological knowledge in the ontology is identified using the identified relational data and the ontology. A result is returned to the requester.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for querying relational data and semi-structured ontology data in a database management apparatus, the method comprising:
   extracting encoded class hierarchies and encoded transitive properties from the semi-structured ontology data into trees;
   constructing implication graphs by extracting encoded implication rules;
   encoding the trees and the implication graphs into extensive markup language;
   registering a virtual view in the database management apparatus by:
      associating a subset of data elements in the relational data with the encoded trees and implication graph data; and
      creating in a virtual view the associated subset of data elements into actual columns and the associated encoded data into virtual columns, wherein the associated encoded data in the virtual columns is not materialized and only inferred when a query is made that requires that values be derived;
   responsive to the query requiring an inference of the virtual view data contained in the virtual columns, rewriting, by the virtual view query processor, the query and sending the rewritten query to a query engine processor of the virtual view for processing and returning a result of the rewritten query, wherein the result comprises identified relational data and materialized values derived in real time from the virtual view data contain in the virtual columns of the virtual view; and
   responsive to the query not requiring an inference of the virtual view data contained in the virtual columns, querying, by a virtual view query processor of the virtual view, the virtual view data contained in the actual columns and returning the results of the query.

2. The method of claim 1, further comprising:
   receiving ontology files and ontology identifier in an ontology repository; and
   registering ontology files with ontology identifier with the ontology repository.

3. The method of claim 2, wherein extracting encoded class hierarchies further comprises:
   specifying subclass relationships using restrictions; and
   expressing the subclass relationships using binary set relations such as intersection and union operators.

4. The method of claim 2, wherein extracting the encoded transitive properties further comprises:
   scanning the ontology for all instances of a selected encoded transitive property; and
   constructing a transitive tree.

5. The method of claim 2,
   wherein constructing the implication graphs further comprises:
      beginning with at least one empty implication graph;
      scanning the ontology files for implications;
      filtering out the implications associated with the encoded class hierarchies and the encoded transitive properties leaving only general implications;
      retrieving the general implications;
      classifying the general implications as one of complex, conjunctive, or disjunctive;
   responsive to the general implication being classified as conjunctive, decomposing the general implication into a set of simple implications;
   inserting vertices of one of clause and operand corresponding to a current implication into the at least one implication graph; and
   inserting edges of one of imply and operand corresponding to the current implication into the at least one implication graph.

6. The method of claim 5, further comprising:
   searching the at least one implication graph for matching sub-graphs;
   enumerating dependent clauses of the matching sub-graphs;
   eliminating duplicate dependent clauses;
   determining whether there is a next sub-graph;
   responsive to iteratively determining there is a next matching sub-graph, enumerating the dependent clauses of the next matching sub-graph and eliminating the duplicate dependent clauses of the next matching sub-graph;
   rewriting query predicate; and
   responsive to at least one dependent clause involving a subsumption, rewriting the at least one dependent clause with a subsumption predicate.

7. A database management apparatus for querying relational data and semi-structured ontology data in a database, the database management apparatus comprising:
   a bus;
   a storage device connected to the bus, wherein the storage device contains computer usable code and the data;
   a communications unit connected to the bus; and
   a processing unit connected to the bus for executing the computer usable code extracting encoded class hierarchies and encoded transitive properties from the semi-structured ontology data into trees, constructing implication graphs by extracting encoded implication rules, encoding the trees and the implication graphs into extensive markup language, registering a virtual view in the database management apparatus by: associating a subset of data elements in the relational data with the encoded data; and creating in a virtual view the associated subset of data elements into actual columns and the associated encoded data into virtual columns, wherein the associated encoded data in the virtual columns is not materialized and only inferred when a query is made that requires that values be derived, responsive to the query requiring an inference of the virtual view data contained in the virtual columns, rewriting, by the virtual view query processor, the query and sending the rewritten query to a query engine processor of the virtual view for processing and returning a result of the rewritten query, wherein the result comprises identified relational data and materialized values derived in real time from the virtual view data contain in the virtual columns of the virtual view—and responsive to the query not requiring an inference of the virtual view data contained in the virtual columns, querying, by a virtual view query processor of the virtual view, the virtual view data contained in the actual columns and returning the results of the query.

8. The database management apparatus of claim 7, further comprising:
receiving ontology files and ontology identifier in an ontology repository; and
registering ontology files with ontology identifier with the ontology repository.

9. The database management apparatus of claim 8, wherein extracting encoded class hierarchies further comprises:
specifying subclass relationships using restrictions; and
expressing the subclass relationships using binary set relations such as intersection and union operators.

10. The database management apparatus of claim 7, wherein extracting the encoded transitive properties further comprises: scanning the ontology for all instances of a selected encoded transitive property; and constructing a transitive tree.

11. The database management apparatus of claim 8, wherein constructing the implication graphs further comprises:
beginning with at least one empty implication graph;
scanning the ontology files for implications;
filtering out the implications associated with the encoded class hierarchies and the encoded transitive properties leaving only general implications;
retrieving the general implications;
classifying the general implications as one of complex, conjunctive, or disjunctive;
responsive to the general implication being classified as conjunctive, decomposing the general implication into a set of simple implications;
inserting vertices of one of clause and operand corresponding to a current implication into the at least one implication graph; and
inserting edges of one of imply and operand corresponding to the current implication into the at least one implication graph.

12. The database management apparatus of claim 11, further comprising:
searching the at least one implication graph for matching sub-graphs;
enumerating dependent clauses of the matching sub-graphs;
eliminating duplicate dependent clauses;
determining whether there is a next sub-graph;
responsive to iteratively determining there is a next matching sub-graph, enumerating the dependent clauses of the next matching sub-graph and eliminating the duplicate dependent clauses of the next matching sub-graph;
rewriting query predicate; and
responsive to at least one dependent clause involving a subsumption, rewriting the at least one dependent clause with a subsumption predicate.

13. The database management apparatus of claim 8, wherein extracting encoded class hierarchies and encoded transitive properties from the semi-structured ontology data into trees is performed by an ontology processor.

14. A computer program product comprising a computer usable medium including computer usable program code for querying relational data and semi-structured ontology data in a database management apparatus, the computer program product comprising:
computer usable program code extracting encoded class hierarchies and encoded transitive properties from the semi-structured ontology data into trees;
computer usable program code constructing implication graphs by extracting encoded implication rules;
computer usable program code encoding the trees and the implication graphs data into extensive markup language;
computer usable program code registering a virtual view in the database management apparatus by:
associating a subset of data elements in the relational data with the encoded trees and implication graph data; and
creating in a virtual view the associated subset of data elements into actual columns and the associated encoded data into virtual columns, wherein the associated encoded data in the virtual columns is not materialized and only inferred when a query is made that requires that values be derived;
responsive to the query requiring an inference of the virtual view data contained in the virtual columns, computer usable code
rewriting, by the virtual view query processor, the query and sending the rewritten query to a query engine processor of the virtual view for processing and returning a result of the rewritten query, wherein the result comprises identified relational data and materialized values derived in real time from the virtual view data contain in the virtual columns of the virtual view; and
responsive to the query not requiring an inference of the virtual view data contained in the virtual columns, computer usable code querying, by a virtual view query processor of the virtual view, the virtual view data contained in the actual columns and returning the results of the query.

15. The computer program product of claim 14, further comprising:
computer usable code ontology files and ontology identifier in an ontology repository; and
computer usable code registering ontology files with ontology identifier with the ontology repository.

16. The computer program product of claim 15, wherein extracting encoded class hierarchies further comprises:
specifying subclass relationships using restrictions; and
expressing the subclass relationships using binary set relations such as intersection and union operators.

17. The computer program product of claim 15, wherein extracting the encoded transitive properties further comprises:

computer usable code scanning the ontology for all instances of a selected encoded transitive property; and computer usable code for constructing a transitive tree.

18. The computer program product of claim 14, wherein constructing the implication graphs further comprises:

beginning with at least one empty implication graph;

scanning the ontology files for implications;

filtering out the implications associated with the encoded class hierarchies and the encoded transitive properties leaving only general implications;

retrieving the general implications;

classifying the general implications as one of complex, conjunctive, or disjunctive;

responsive to the general implication being classified as conjunctive, decomposing the general implication into a set of simple implications;

inserting vertices of one of clause and operand corresponding to a current implication into the at least one implication graph; and inserting edges of one of imply and operand corresponding to the current implication into the at least one implication graph.

19. The computer program product of claim 14, further comprising:

searching the at least one implication graph for matching sub-graphs;

enumerating dependent clauses of the matching sub-graphs;

eliminating duplicate dependent clauses;

determining whether there is a next sub-graph;

responsive to iteratively determining there is a next matching sub-graph, enumerating the dependent clauses of the next matching sub-graph and eliminating the duplicate dependent clauses of the next matching sub-graph;

rewriting query predicate; and responsive to at least one dependent clause involving a subsumption, rewriting the at least one dependent clause with a subsumption predicate.

20. The computer program product of claim 14, wherein extracting encoded class hierarchies and encoded transitive properties from the semi-structured ontology data into trees is performed by an ontology processor.

* * * * *